US007793621B2

(12) United States Patent
Stehl et al.

(10) Patent No.: US 7,793,621 B2
(45) Date of Patent: Sep. 14, 2010

(54) ALTERNATIVE FUEL ENGINE

(75) Inventors: William Stehl, Simi Valley, CA (US);
Tyson Larson, Simi Valley, CA (US)

(73) Assignee: Realm Industries, Simi Valley, CA (US)

( * ) Notice: Subject to any disclaimer, the term of this patent is extended or adjusted under 35 U.S.C. 154(b) by 35 days.

(21) Appl. No.: 12/244,648

(22) Filed: Oct. 2, 2008

(65) Prior Publication Data

US 2009/0090312 A1 Apr. 9, 2009

Related U.S. Application Data

(63) Continuation-in-part of application No. 11/973,170, filed on Oct. 5, 2007.

(51) Int. Cl.
*F02B 51/00* (2006.01)
(52) U.S. Cl. ..................... 123/25 C; 123/538
(58) Field of Classification Search ...... 123/25 A–25 F, 123/575–578, 538
See application file for complete search history.

(56) References Cited

U.S. PATENT DOCUMENTS

| 4,074,101 A | 2/1978 | Kiuchi et al. |
| 4,150,956 A | 4/1979 | Vaseen |
| 4,394,230 A | 7/1983 | Puharich |
| 4,798,661 A | 1/1989 | Meyer |
| 4,936,961 A | 6/1990 | Meyer |
| 5,149,407 A | 9/1992 | Meyer |
| 5,154,142 A * | 10/1992 | Kamo .................. 123/25 F |
| 5,238,546 A | 8/1993 | Bergmann et al. |
| 5,238,547 A | 8/1993 | Tsubouchi et al. |
| 5,395,490 A | 3/1995 | Hoff et al. |
| 5,450,832 A | 9/1995 | Graf |

(Continued)

FOREIGN PATENT DOCUMENTS

JP 2000345195 12/2000

(Continued)

OTHER PUBLICATIONS

Balbuena, Perla B. et al., "Molecular Dynamics Simulation of Electrolyte Solutions in Ambient and Supercritical Water.1.Ion Solvation", J. Phys. Chem.

(Continued)

*Primary Examiner*—M. McMahon
(74) *Attorney, Agent, or Firm*—Cislo & Thomas, LLP

(57) ABSTRACT

An apparatus and method for converting fluid molecules from a liquid state into a vapor state wherein the fluid has unnatural bond angles. The apparatus comprises a resistor-capacitor (RC) circuit, a chamber to contain the RC circuit and the fluid and a power source to provide power to the RC circuit. The RC circuit comprises an anode, a cathode and a plurality of substantially parallel electrically conductive plates. Current through the RC circuit generates a frequency that modifies the bond angles of molecules in a vapor state. Ignition of these molecules with unnatural bond angles reverts the molecules back to normal bond angles with a release of energy that can be utilized in many different applications without the release of toxic or noxious gases, greenhouse gases or any interaction with the atmosphere or the consumption of any atmospheric oxygen. For example, the molecules with unnatural bond angles may be used in engines to power a motorized vehicle.

22 Claims, 20 Drawing Sheets

U.S. PATENT DOCUMENTS

| | | | |
|---|---|---|---|
| 5,738,766 A | 4/1998 | Jefferson | |
| 5,997,812 A | 12/1999 | Burnham et al. | |
| 6,165,339 A | 12/2000 | Ibbott | |
| 6,232,006 B1 | 5/2001 | Breault | |
| 6,576,126 B1 | 6/2003 | Kobayashi | |
| 6,689,259 B1 | 2/2004 | Klein | |
| 6,866,756 B2 | 3/2005 | Klein | |
| 7,033,478 B2 | 4/2006 | Harde | |
| 7,191,737 B2 | 3/2007 | Klein | |
| 7,198,254 B2 * | 4/2007 | Holloway et al. | 261/36.1 |
| 2002/0169345 A1 | 11/2002 | Johnson | |
| 2003/0168393 A1 | 9/2003 | Tsunematsu | |
| 2003/0196946 A1 | 10/2003 | Denzer | |
| 2005/0029120 A1 | 2/2005 | Bar-Gadda | |
| 2005/0178710 A1 | 8/2005 | Kitada | |
| 2006/0169595 A1 | 8/2006 | Schlager | |
| 2006/0272624 A1 * | 12/2006 | Pettersson | 123/568.12 |
| 2007/0012264 A1 | 1/2007 | Holt et al. | |
| 2007/0021920 A1 | 1/2007 | Ishikawa et al. | |
| 2007/0021921 A1 | 1/2007 | Ishikawa et al. | |
| 2007/0021922 A1 | 1/2007 | Ishikawa et al. | |
| 2007/0021923 A1 | 1/2007 | Ishikawa et al. | |
| 2007/0021924 A1 | 1/2007 | Ishikawa et al. | |
| 2007/0021927 A1 | 1/2007 | Ishikawa et al. | |
| 2007/0029261 A1 | 2/2007 | Chew | |
| 2007/0181083 A1 | 8/2007 | Fulton et al. | |
| 2009/0092540 A1 * | 4/2009 | Stehl et al. | 423/580.1 |

FOREIGN PATENT DOCUMENTS

| | | |
|---|---|---|
| WO | WO 98/05595 | 2/1998 |

OTHER PUBLICATIONS

Nov. 25, 1995, 2706-2715, vol. 100, No. 7, Department of Chemical Engineering and Department of Chemistry and Biochemistry, The University of Texas at Austin, Austin, US.

* cited by examiner

ALTERNATIVE FUEL ENGINE

CROSS-REFERENCE TO RELATED APPLICATION

This patent application is a continuation-in-part application of U.S. patent application Ser. No. 11/973,170 filed Oct. 5, 2007 entitled "METHOD AND APPARATUS OF MODIFYING BOND ANGLES OF MOLECULES," which application is incorporated in its entirety here by this reference.

TECHNICAL FIELD

This invention relates to motorized vehicles, specifically automobiles powered by an energy source other than conventional fuels, such as gasoline, diesel, alcohol, hydrogen, and the like.

BACKGROUND ART

Alternative sources of fuel have been the subject of concern for many years due to the limited practical energy resources and the dangerous byproducts produced. Currently, over 70% of the energy generated comes from fossil fuels. These fossil fuels are converted to oil and natural gas. The burning of oil and natural gas leads to the production of electrical energy with carbon dioxide and other toxic gases released as the byproduct. The production of carbon dioxide is purported to be involved in the greenhouse effect.

A significant source of toxic gases, such as hydrocarbons, nitrogen oxides, carbon monoxide, and carbon dioxide, released into the air is from automobiles burning gasoline. To combat these toxic emissions, alternative sources of fuel have been investigated. Ethanol has been used alone or mixed with gasoline to reduce reliance on gasoline; however, energy production is lower than gasoline alone and production can be time consuming. Electric cars eliminate toxic byproducts, but power output is also low and charging stations, like gasoline stations would be required. Hydrogen powered cars have been under development, but pose a danger due to the explosiveness of hydrogen.

Thus, there is a need for a safe, renewable, alternative fuel to power motorized vehicles that can be quickly and easily produced, is easy and safe to use, and is cost-effective.

SUMMARY

The present invention is directed towards a method and an apparatus for changing bond angles of a molecule. The apparatus comprises a resistor-capacitor (RC) circuit to generate a resonating frequency sufficient to modify the bond angles of a molecule but insufficient to break the covalent bonds between molecules. The RC circuit comprises an anode, a cathode and a plurality of parallel electrically conductive plates separated by a narrow gap of less than 1 inch. The RC circuit is contained inside a chamber containing a fluid, such as water. A dual frequency created by the RC circuit and a power supply generates an optimal frequency conducive for modify bond angles. It is believed that modification of bond angles converts the fluid molecules into a vapor state. The vapor molecules with unnatural bond angles can be stored in a pressurized vessel for use in numerous applications.

For example, these vapor molecules with unnatural bond angles can be used to power motorized vehicles, such as automobiles. A pressurized vessel containing the vapor molecules with unnatural bond angles may be placed in a convenient location in an automobile. A gas line can connect the pressurized vessel with the intake system or directly into the cylinder of an engine to power the vehicle.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
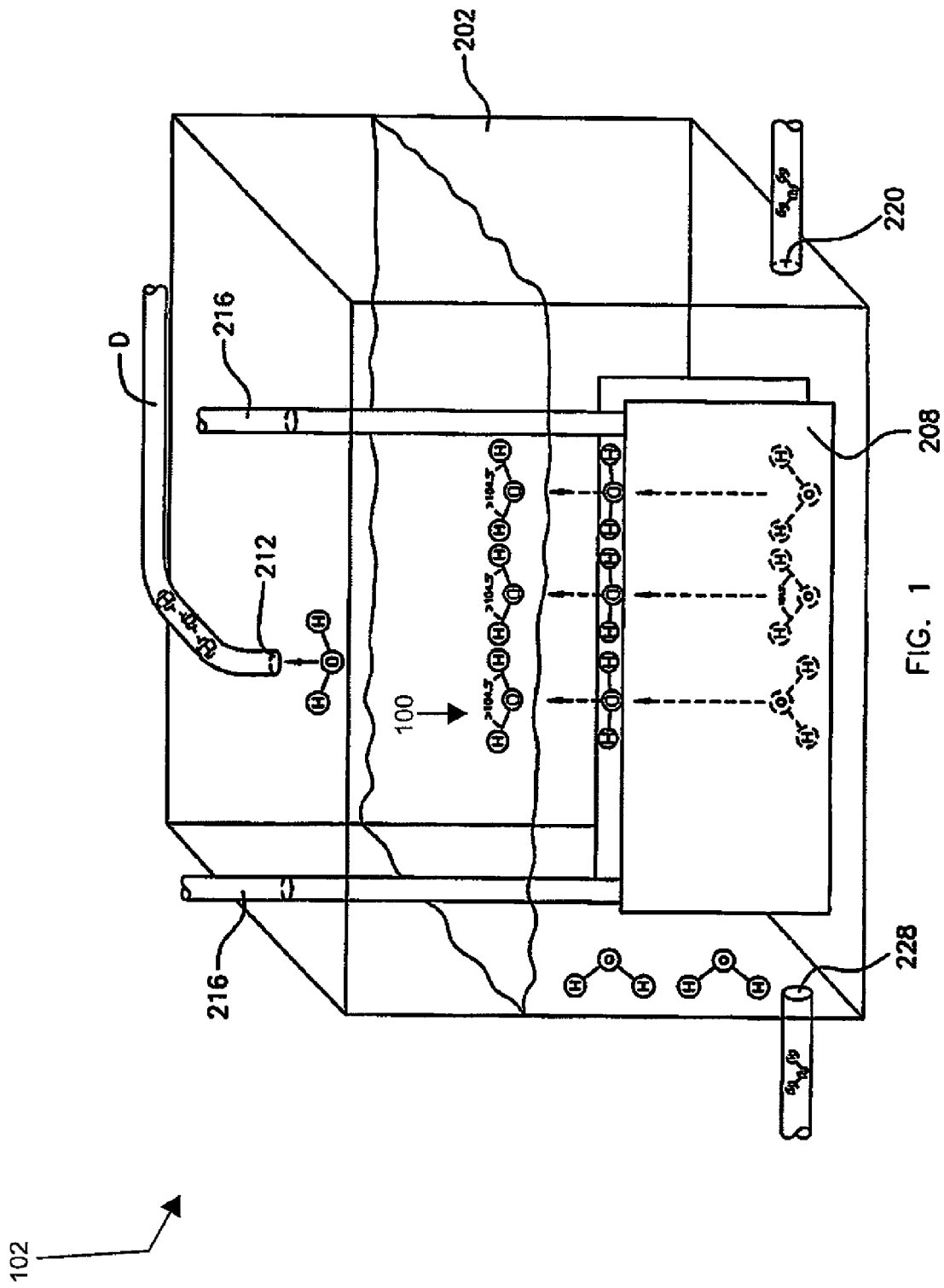
FIG. 1 is a front view of an embodiment of the current invention showing a possible effect on the bond angles of water.

The invention is directed towards an apparatus 102 and method for generating pressurized vapor molecules with unnatural bond angles, for example, a water molecule with a bond angle greater than approximately 104.5 degrees as shown in FIG. 1. Although the embodiments are described with water as the fluid, other fluids may be used, including fluids mixed with water and fluids that are substantially water or where water makes up the base component of the fluid. In addition, there is no requirement for the water to be purified. Without being bound by theory, the inventors believe that the conversion of a water molecule with an unnatural bond angle 100 back to a water molecule with a natural bond angle results in the release of energy. The energy released can be used in an unlimited number of applications. In addition, the water molecules with unnatural bond angles 100 impart improved electrical properties over water molecules with natural bond angles.

This process and resulting product have advantages over the traditional electrolysis process in that less energy is consumed in making the product and the product produced, that is water molecules with unnatural bond angles 100, is safer to use than the highly explosive hydrogen gas produced by electrolysis. In addition, unlike electrolysis, which requires the use of water and added electrolytes, the current method and apparatus does not require the addition of any electrolytes to the water or solution. In other words, pure water may be used.

Figure 2:
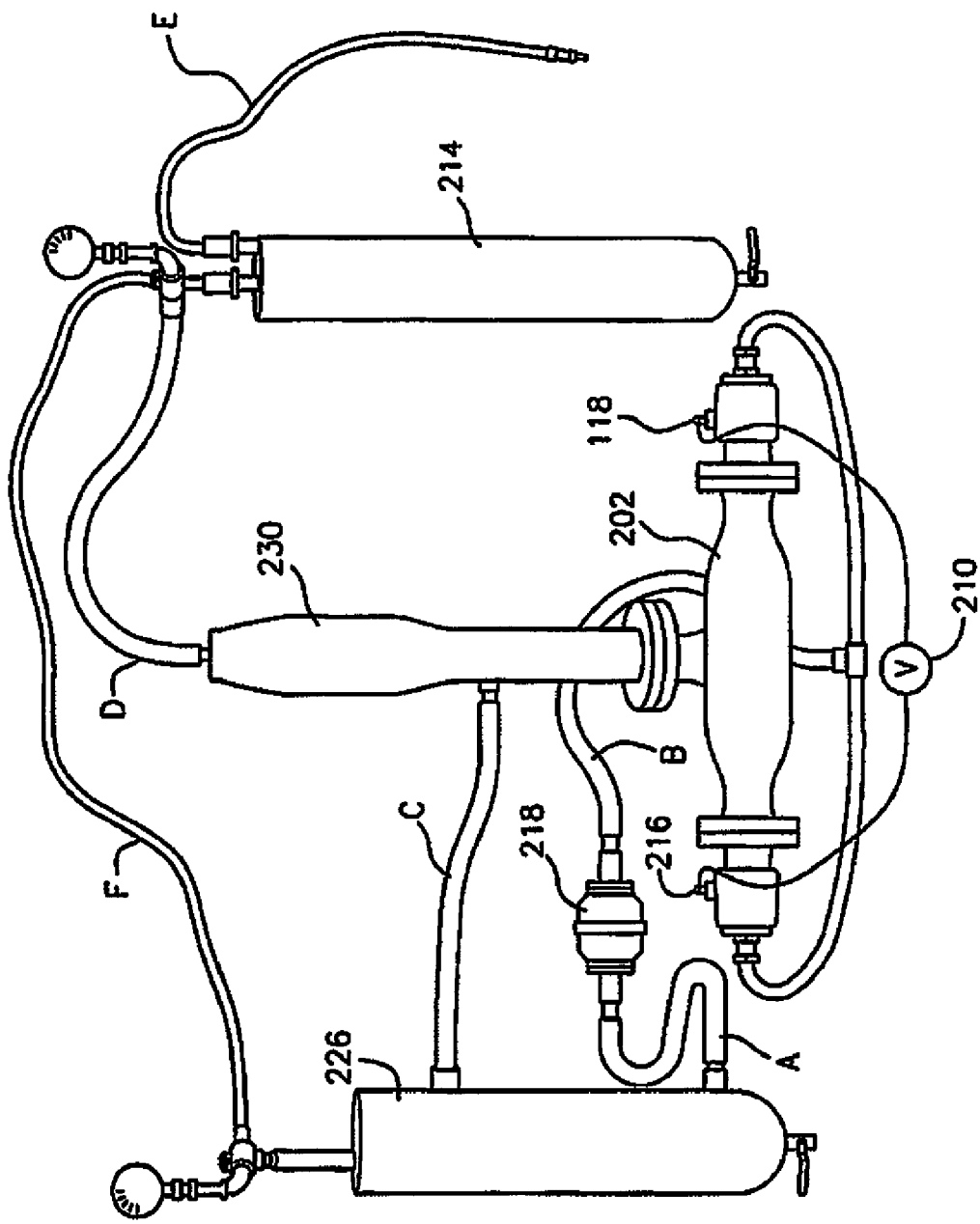
FIG. 2 is a front view of another embodiment of the current invention.
Figure 3:
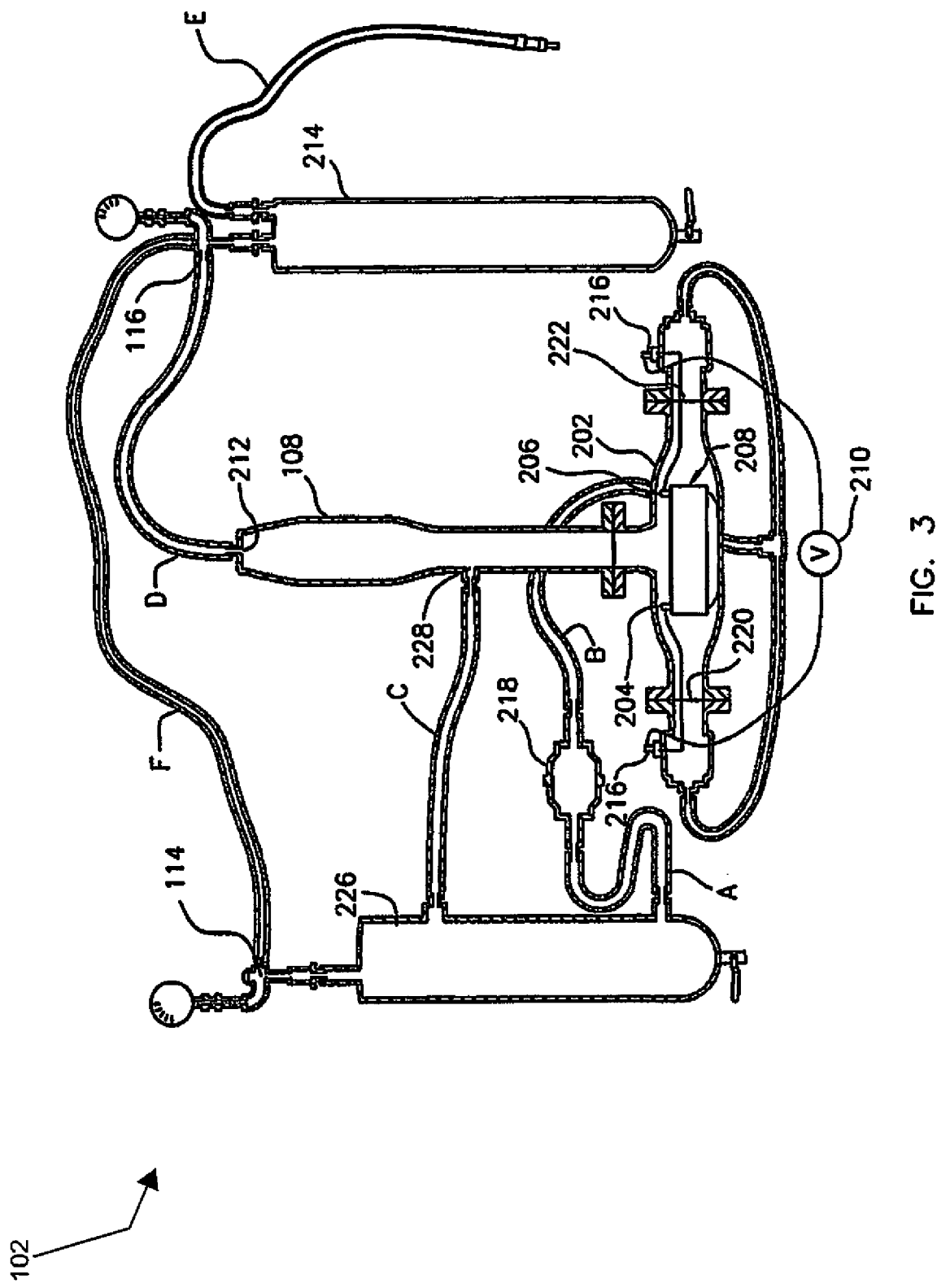
FIG. 3 is a cross-section of the embodiment shown in FIG. 2.
Figure 4:
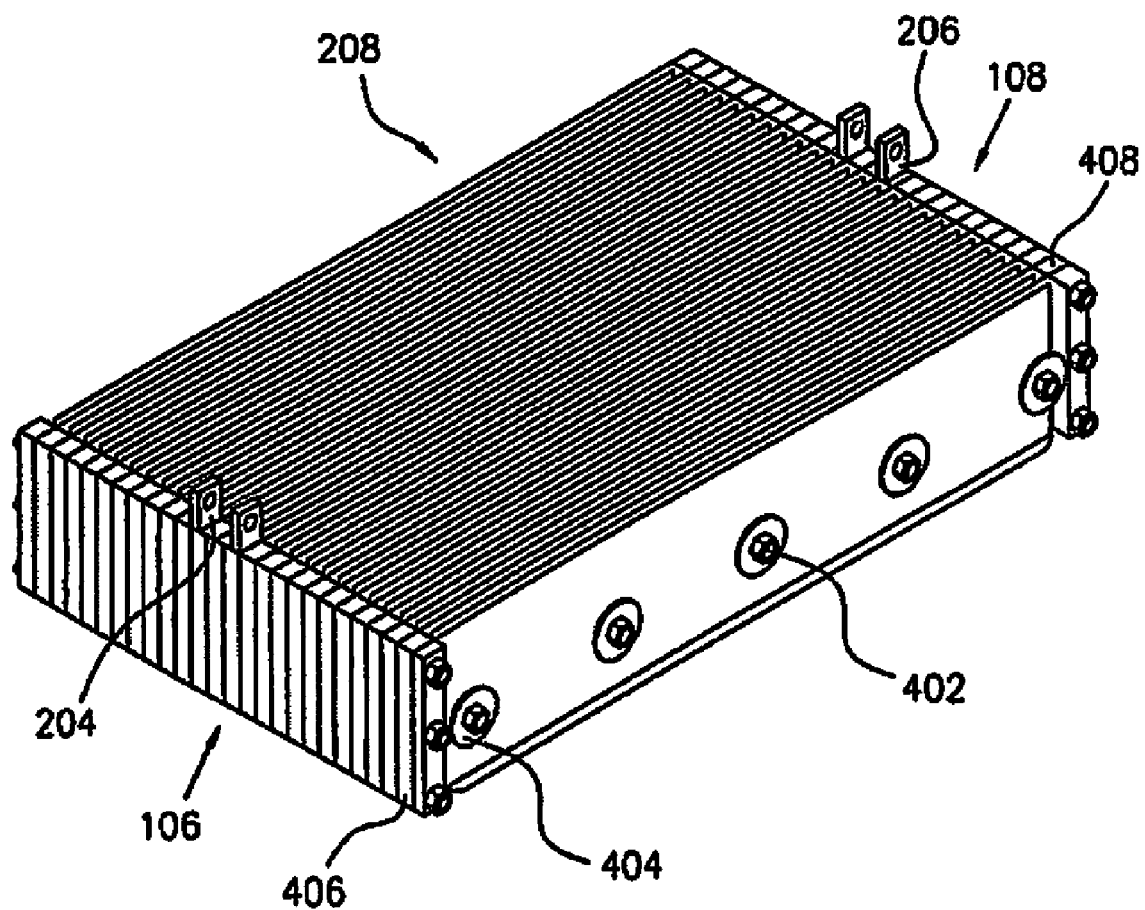
FIG. 4 is a perspective view of an embodiment of the electrically conductive plates.
Figure 5:
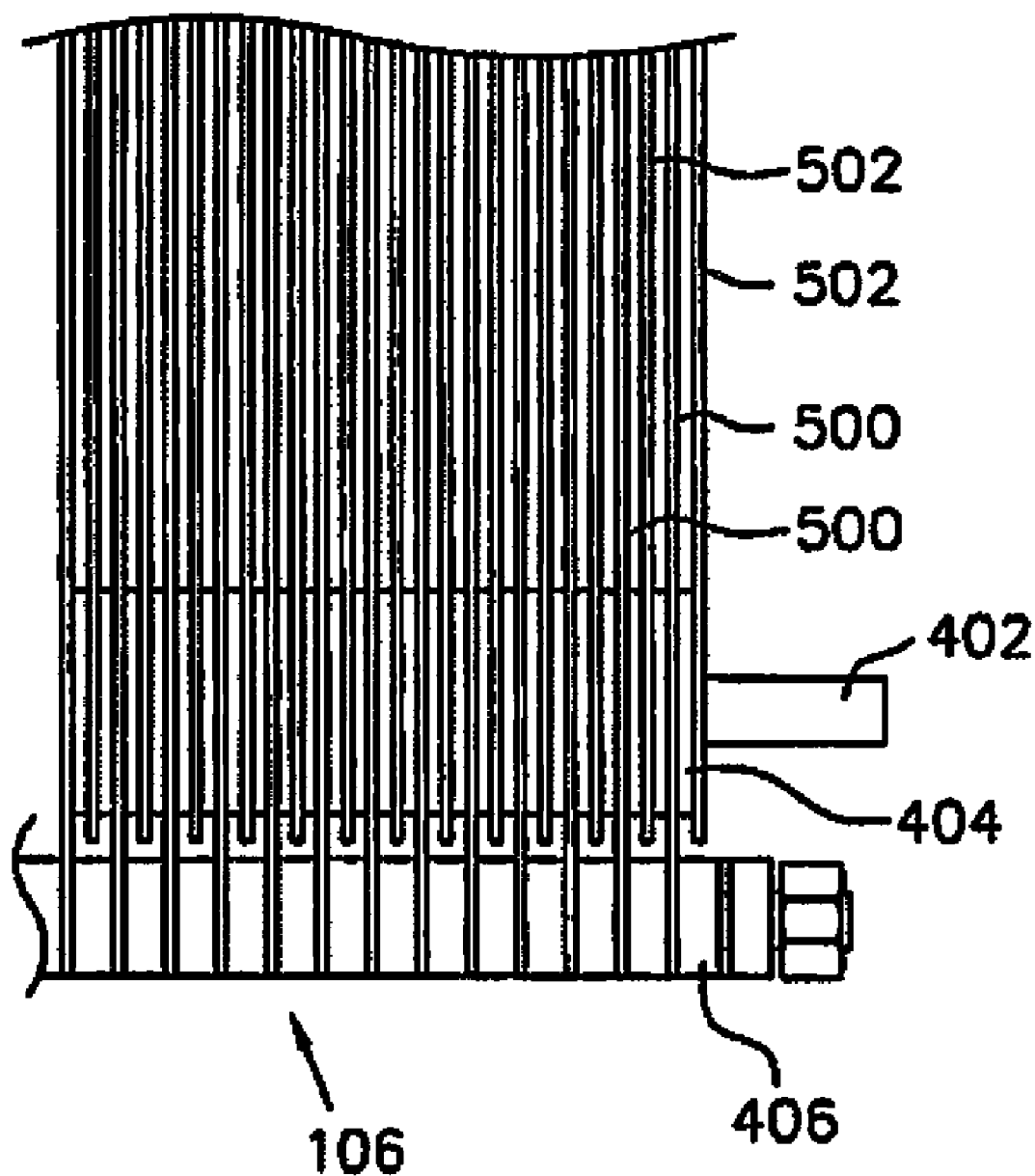
FIG. 5 is a close up of the top view of the electrically conductive plates.

As shown in FIGS. 2 and 3, the apparatus 102 for generating water molecules with unnatural bond angles 100 comprises a chamber 202 containing a fluid or water, an anode 204, a cathode 206, and a plurality of electrically conductive plates 208 connected either to the anode 204 or the cathode 206; and a voltage source 210. The electrically conductive plates 208 are arranged in parallel and are alternatingly connected to the anode and the cathode such that an anode connected plate is parallel and adjacent to a cathode connected plate as shown in FIGS. 4 and 5. The anode 204 is electrically connected to the positive terminal of the voltage source and the cathode 206 is electrically connected to the negative terminal of the voltage source effectively creating a resistor capacitor circuit for the generation of water vapors with unnatural bond angles.

The apparatus 102 for generating water molecules with unnatural bond angles 100 further comprises a water vapor outlet 212 to allow the water vapor molecules to escape and a pressure vessel 214 connected to the water vapor outlet 212 to contain the escaped water molecules with unnatural bond angles. Without being bound by theory, the inventors believe that applying a predetermined amount of power to the electrically conductive plates 208 creates agitation and modification of bond angles of the water molecules on the surface of the plates without breaking covalent bonds. The agitation and modification of bonds into unnatural angles disrupts the non-covalent interactions of water molecules with each other, resulting in water vapors. The water vapors escape from the liquid water, thereby increasing the pressure within the vessel. The pressure build-up further facilitates maintaining water molecules with unnatural bond angles in a vapor state. Ignition of this water vapor causes the bond angles to return to their natural state and release energy.

The current applied to the anode 204, cathode 206, and electrically conductive plates 208 causes the water molecules to have a weak dielectric constant, which effectively generates a resistor-capacitor (RC) circuit, with a fixed capacitor in parallel with a variable resistor, generating an oscillating or resonating frequency. The resonating frequency may be calculated as the inverse of the product of the resistance and the capacitance. The resistance changes as a function of the purity of the fluid, the changes in electrical resistivity based upon the nature of the impurities in the fluid, the amount of the gas entrained in the fluid, the rate of circulation of the fluid, the surface tension of the fluid, the pressure in the vessel, the amount of vapor produced and the temperature of the water. The capacitance is a function of the applied current, the surface area of the electrically conductive plates 208 and number of electrically conductive plates 208, and the gap between plates 208. It is believed the resonating frequency in combination with the intrinsic or inherent frequency generated by the power source 210, which has a different frequency, amplitude, and cycle than the resonating frequency, results in an optimal modified frequency, referred to as the modifying frequency, that facilitates the agitation and modification of bond angles without breaking covalent bonds, resulting in water vapors with unnatural bond angles. In addition, the water vapor with unnatural bond angles adopts an electrical property and a magnetic property that can be utilized in a variety of applications. This is distinguishable from the electrolysis process in which covalent bonds are broken and diatomic hydrogen and oxygen gases are generated without any electrical or magnetic properties. In addition, electrolysis requires higher levels of energy since breaking of covalent bonds is required as opposed to modification of bond angles.

A computer may be implemented to automatically calculate the proper parameters necessary to generate a predetermined optimal frequency based upon feedback received from the operating unit.

For reasons not completely understood, this dual frequency stimulation results in better performance, or better production of water vapors with unnatural bond angles, than a single frequency stimulus that is equivalent to the sum of the dual frequency stimulation. It is theorized that one frequency delivers the necessary power characteristics to the fluid while the compounded frequency delivers the vibratory energy necessary to the modification of the bonding angle. In addition, the dual frequency stimulation provides for broader range of frequencies than a single frequency stimulus. It is theorized that the use of multiple frequencies, that is, more than two frequencies, may improve the efficiency of the apparatus. The resonating frequency may be approximately 50 Hz to approximately 40 KHz. Preferably the resonating frequency is approximately 1 KHz to approximately 22 KHz.

Unlike electrolysis, which requires direct current, the current invention may use alternating current or direct current. Therefore, electricity from a standard outlet can be used to power the apparatus.

The current may be supplied by any power source 210 of approximately 1 volt to approximately 500 volts. Preferably the power source 210 is from approximately 2 volts to approximately 24 volts. The preferred amount of current utilized is a function of the surface area of the plates 208 and the distance between the plates and the varying resistance of the substance between plates. The voltage and current can be adjusted to produce approximately 1 watt per square feet of surface area to approximately 100 watts per square feet of surface area. Adjustment beyond this level is possible should it be required for efficient operation of the apparatus.

In one embodiment, the current is continuously applied to the plates 208. In another embodiment, the current can be applied with a duty cycle of approximately 0.005 to 0.5 (or 0.5% to approximately 50%). For example, the current can be on for 2 milliseconds then off for 98 milliseconds. The predetermined duty cycle may be generated by using a MOSFET array or SCR networks. The duty cycle may be modified by a computer in real time based upon feedback received from the apparatus. In one embodiment, the MOSFET array is powered by DC supply. In a preferred embodiment, the MOSFET array is powered by a battery.

In some embodiments, a power pass through 216 connects the voltage source 210 with the anode 204 and the cathode 206 to supply current to the anode plate and the cathode plate at the anode terminal and cathode terminal, respectively. In one embodiment, two anode terminals and two cathode terminals are used to provide structural stability for the plates. The two anode terminals and the two cathode terminals can be secured through their respective power pass throughs 216.

In some embodiments, the anode 204 and the cathode 206 are plates, each comprising a surface. The anode plate surface and the cathode plate surface may be opposite and parallel to each other. The plurality of electrically conductive plates 208 can be positioned perpendicular to and in between the anode plate and the cathode plate. The electrically conductive plates 208 can be arranged parallel to each other in an alternating arrangement such that a first electrically conductive plate connected to the anode is parallel and adjacent to a second electrically conducive plate connected to the cathode. In other words, a first set of electrically conductive plates 500 may be attached perpendicular to the anode plate with the surface of each electrically conductive plate aligned parallel to each other, thereby creating a plurality of parallel anode plates. A second set of electrically conductive plates 502 may be attached perpendicular to the cathode plate with the surface of each electrically conductive plate aligned parallel with each other, thereby creating a plurality of parallel cathode plates. The plurality of parallel anode plates and the plurality of parallel cathode plates can then be aligned parallel with each other such that the electrically conductive plates from the first and second set are aligned adjacent to each other in alternating fashion as shown in FIGS. 4 and 5. A non-conductive rod 402 can be inserted through the first and second set 500, 502 of electrically conductive plates so as to provide structural stability. Each electrically conductive plate can be separated from the other by a non-conductive washer 404.

The anode plate and the cathode plate may each comprise a plurality of plate holes. Screws or bolts can be inserted into the plate holes to fasten an electrically conductive plate.

In some embodiments each electrically conductive plate has a right angle bend and a plurality of fastener holes to provide a means for attaching the first and second set 500, 502 of electrically conductive plates to the anode 204 or cathode 206, which are parallel to each other, while maintaining a parallel alignment among the electrically conductive plates. Each fastener hole can be aligned with a corresponding hole on the anode or cathode plate.

In another embodiment, the anode plate and the cathode plate may be replaced by a plurality of anode power blocks 406 and cathode power blocks 408. Each electrically conductive plate 208 from the first set 500 of electrically conductive plates may be sandwiched in between each anode power block 406 and each electrically conductive plate 208 of the second set 502 of electrically conductive plates may be sandwiched in between each cathode power block 408 as a means for fastening or securing the electrically conductive plates parallel to each other. The power blocks 406, 408 and electrically conductive plates 208 can be further secured with a rod 402 that passes through each electrically conductive plate 208 and each power block.

The anode 204, the cathode 206, and the plurality of electrically conductive plates 208 can be made of any conductive material such as copper, aluminum, platinum, silver and other metals and metal alloys. Metals that are sturdy and non-corrosive are preferred, such as stainless steel. Other embodiments could utilize flexible electrical conductive materials in irregular shapes with structural integrity and anode/cathode spacing maintained by an appropriate exoskeletal structure or support. Such an embodiment would enable the apparatus to fit into irregular shaped spaces as may be required by some applications. In one embodiment, the electrically conductive plates 208 are sandblasted or sanded to create miniature pits, crevices, points, or edges, thereby increasing the surface area of the electrically conductive plates and enhancing the transfer of energy into the fluid.

The electrically conductive plates 208 can take on an unlimited number of shapes, sizes, and dimensions, constrained only by spacing issues, arrangement, and surface area. In a preferred embodiment, the electrically conductive plates 208 should be parallel to each other. This maximizes the potential number and size of plates that can be placed inside a chamber. In one embodiment, a chamber 202 contained twenty parallel plates 208 having a length of 1 foot and a height of 0.5 foot. In another embodiment, a chamber 202 contained twenty parallel plates 208 having a length of 4 feet and a height of 0.5 foot.

The gap between each adjacent plate 208 can be from approximately 0.05 inch to approximately 1 inch. Preferably each adjacent plate 208 has a gap of approximately less than 0.25 inch. In one embodiment, the gap between adjacent plates 208 is approximately 0.125 inch.

The parallel arrangement also facilitates movement of water in between the electrically conductive plates 208. The movement of water allows water to pass across the surface areas of the electrically conductive plates 208 in between the gap between the electrically conductive plates 208, thereby dislodging the water vapors forming on the electrically conductive plates 208 from the plates causing the water vapor to rise to the surface of the water and escape from the liquid water. In some embodiments, the electrically conductive plates 208 can be a series of cylinders or cones of decreasing size, concentrically arranged one inside another, with open ends. The open ends can be aligned with the direction of the movement of water.

In some embodiments, movement of water can be created by vibrating, rocking, tilting, shaking or otherwise agitating the chamber 202. For example, the chamber 202 may be placed on a rocking or tilting machine. In some embodiments, a chamber 202 may be placed inside a vehicle so as to encounter natural agitation of the water due to vibrations, bumps, turns, acceleration and deceleration of the vehicle. In other embodiments, movement of water is generated by creating a flow of water, for example, with a water pump 110. In some embodiments, one or more ultrasonic transducers could be placed in or upon the chamber 202, the effect of which would be to detach the bubbles of vapor as they are formed.

The chamber 202 may further comprise a water inlet orifice 220. The water inlet orifice 220 may be positioned anywhere on the chamber to generate a continuous flow of water. As shown in FIGS. 2 and 3, to maximize the flow across the electrically conductive plates, the water inlet orifice 220 may be placed adjacent and perpendicular to the electrically conductive plates 208 such that water flowing in through the water inlet orifice 220 will flow parallel with the electrically conductive plates 208 through the gaps. In some embodiment, the chamber 202 may have a second water inlet orifice 222 opposite the first water inlet orifice 220. Water can flow through the first water inlet orifice 220 in a first direction parallel with the electrically conductive plates 208 through the gap at one end of the chamber while also flowing through the second water inlet orifice 222 in a second direction, opposite the first direction, from the other end of the chamber, parallel to the electrically conductive plates 208 into the gaps. Water flowing through the electrically conductive plates 208 from two opposite ends will maximize the water movement at the ends and the middle of the electrically conductive plates, thereby increasing the efficiency of water vapor production. A branching water pipe may be used to supply water simultaneously through the first water inlet orifice 220 in a first direction and through the second water inlet orifice 222 in a second direction, opposite the first direction.

Figure 6:
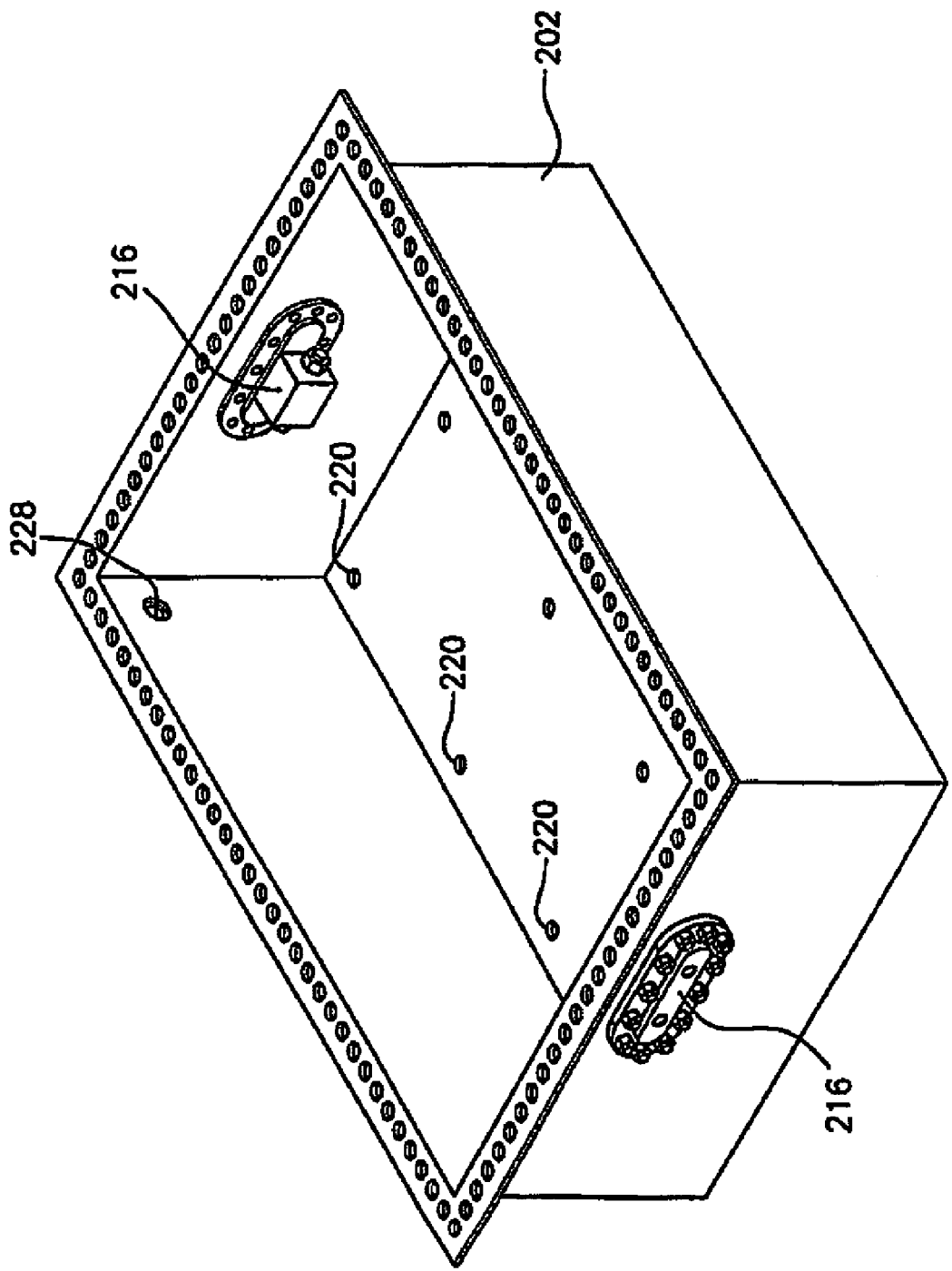
FIG. 6 is a top perspective view of an embodiment of the chamber.
Figure 7:
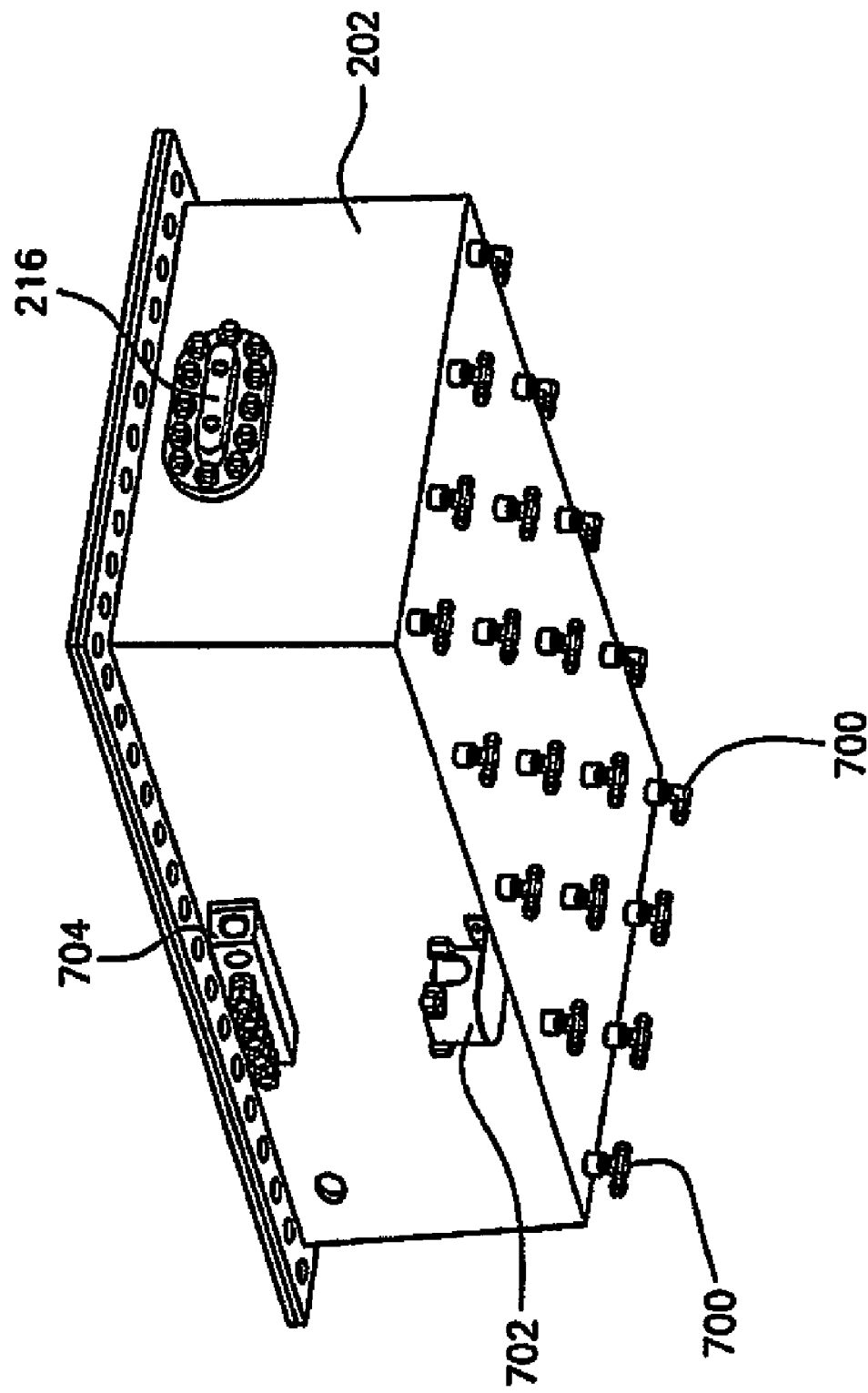
FIG. 7 is a bottom perspective view of an embodiment of the chamber.
Figure 8:
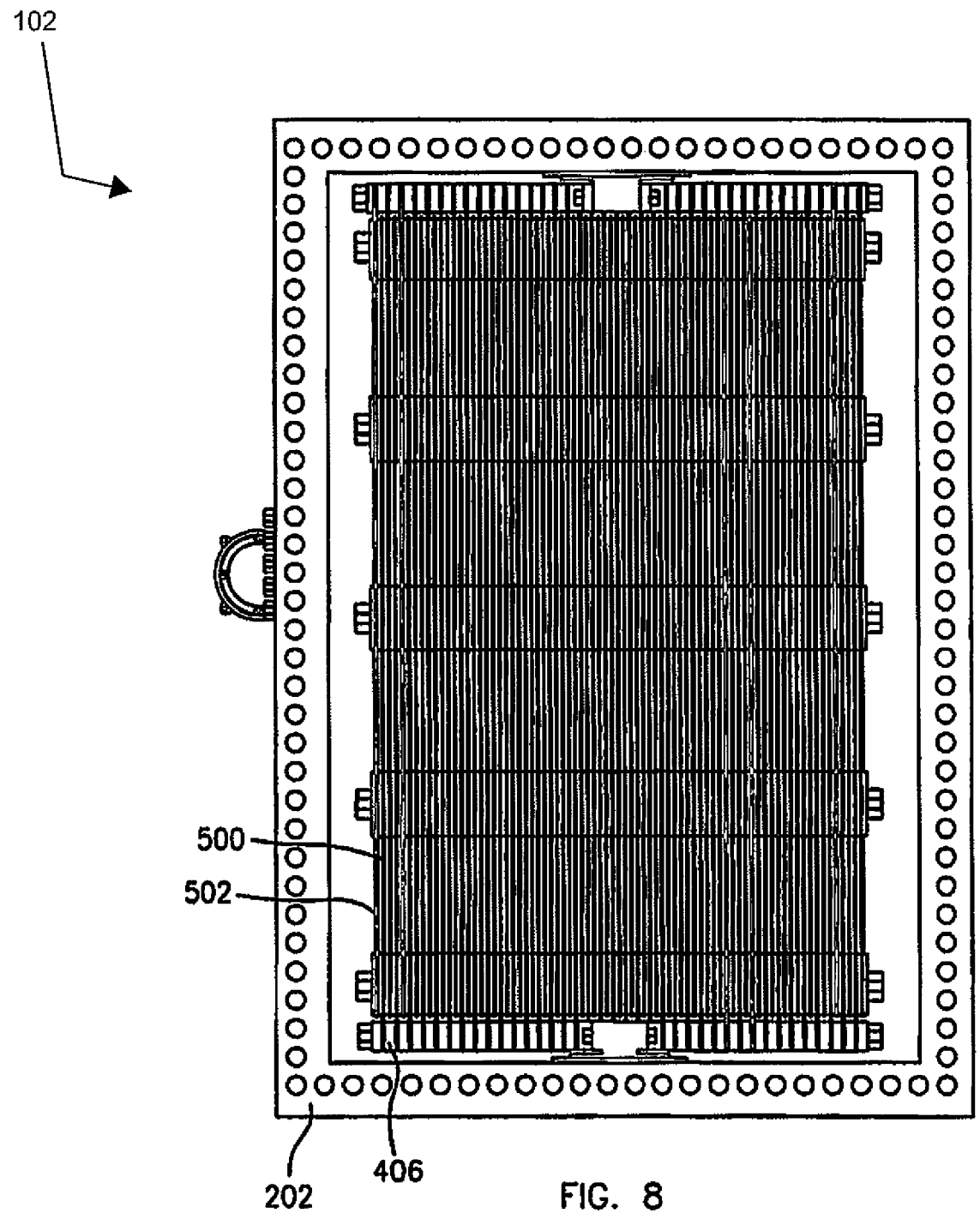
FIG. 8 is a top view of the electrically conductive plates inside the chamber.

In another embodiment, a water inlet orifice 220 may be positioned at the bottom of the chamber, below the electrically conductive plates, with the water flow projecting upwards into the gaps, parallel to the electrically conductive plates as shown in FIGS. 6-8. A plurality of water inlet orifices 220 can be positioned at the bottom of the chamber, below the electrically conductive plates 208 to ensure sufficient water movement across all surfaces. Each water inlet orifice 220 may be equipped with nozzles 700 to help secure tubing.

A water pump 110 may be used to force the flow of water from an external water supply 226 into the chamber through the water inlet orifice 220. In some embodiments, a pump base 702 may be attached near or to the chamber 202 to support the water pump 110. In one embodiment, the water pump 110 draws water from the external water supply 226 through tube A and forces the water into the chamber 202 via tube B.

Figure 10:
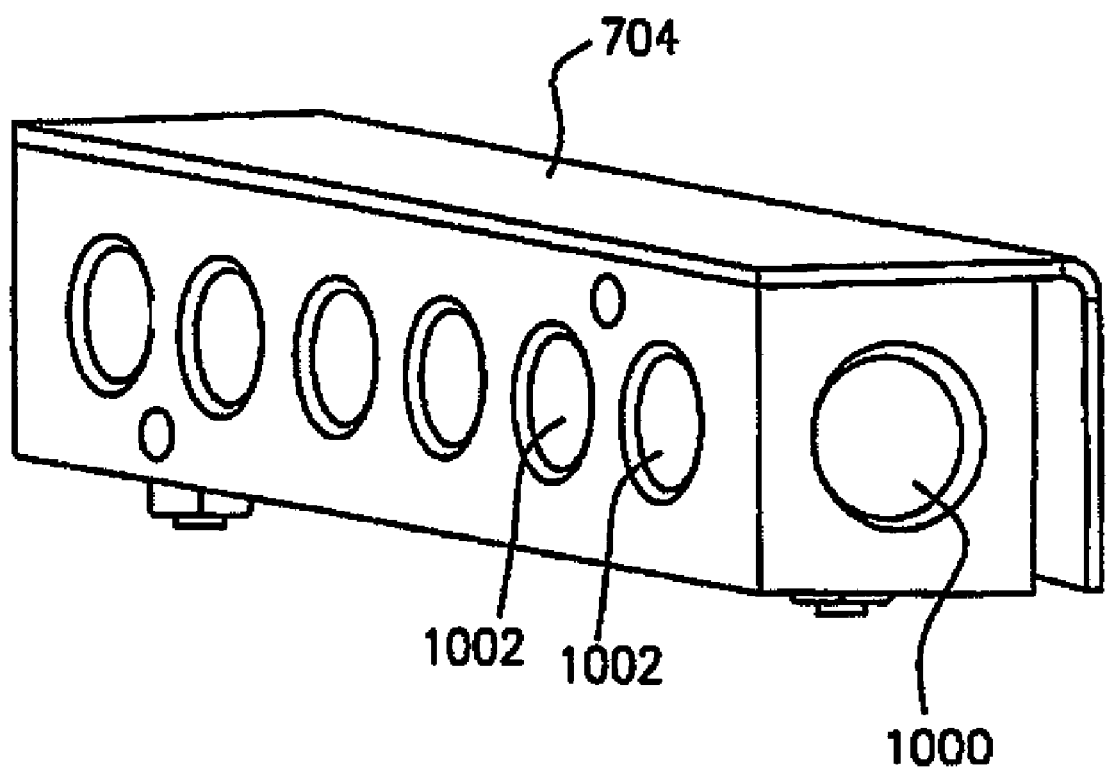
FIG. 10 is perspective view of the water manifold.

In embodiments with a plurality of water inlet orifices 220, a water manifold 704 may be attached near or to the chamber 202. As shown in FIG. 10, the water manifold 702 may comprise at least one entry hole 1000 and a plurality of exit holes 1002. The entry hole 1000 is attached to the water pump 110 to receive water flow. The plurality of exit holes 1002 are connected to tubes that feed back into the water inlet orifices 220 through the nozzles 700 to recycle the water back into the chamber 202.

In embodiments where water is forced through the chamber 202, the chamber 202 may further comprise a water outlet orifice 228. The water outlet orifice 228 can lead back to the water supply 226 via tube C, thereby allowing the water that was not converted into vapors to be recycled. Therefore, water can be added to the chamber 202 to a desired level. When the water pump 110 is turned on water is force into the water manifold 704 where the water splits into a plurality of tubes connected to the plurality of water inlet orifices 220, thereby forcing water into the chamber 202. In embodiments without a water manifold 704, the water pump 110 pumps the water directly to the water inlet orifice 220. From the chamber 202 the water is forced out the water outlet orifice 228 back into the water pump 226, thereby forming a closed loop.

Figure 9:
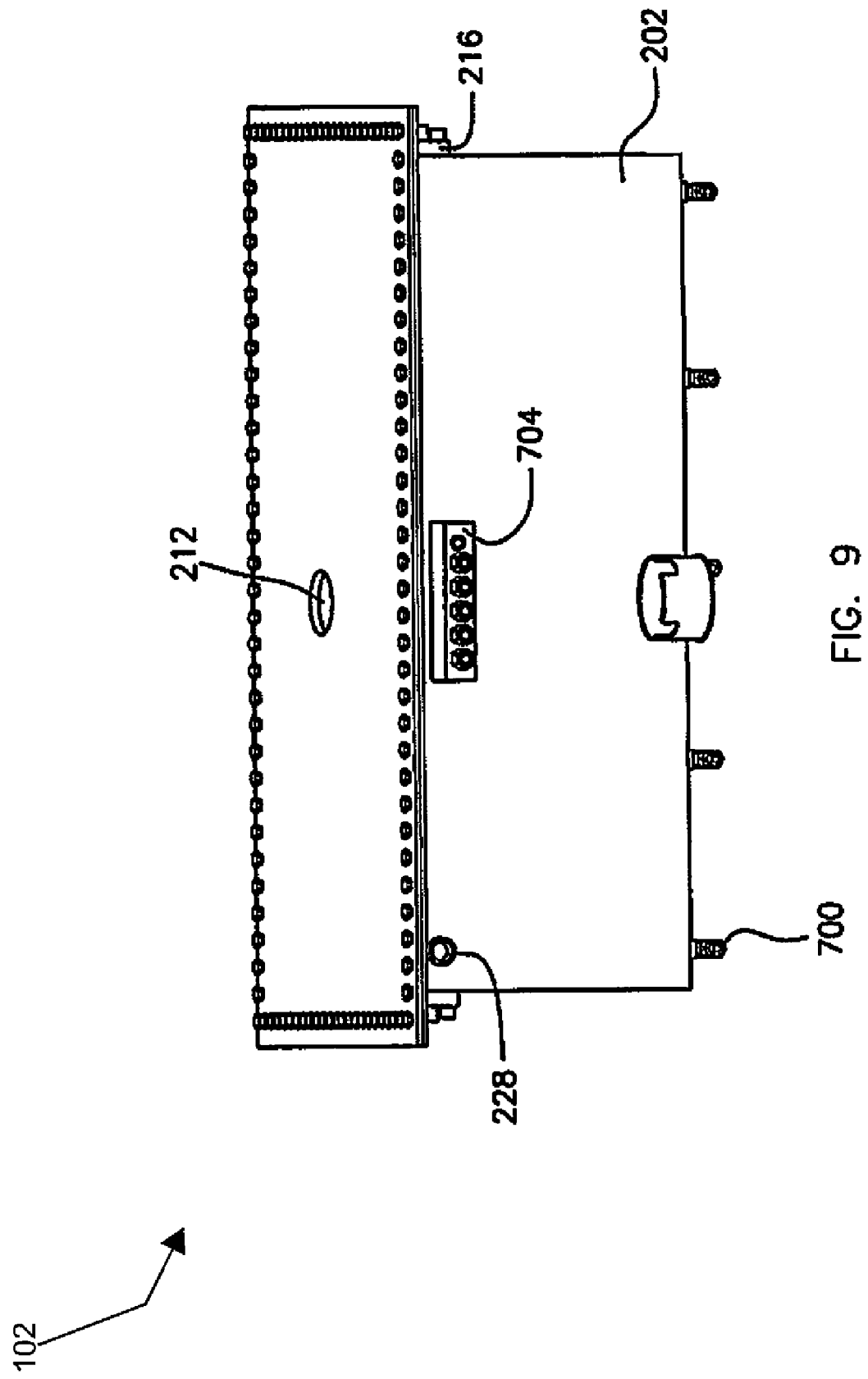
FIG. 9 is a front perspective view of an embodiment of the current invention.

As shown in FIGS. 3 and 9, the water vapor outlet 212 may be located above the electrically conductive plates. Preferably, the water vapor outlet 212 is located close to the electrically conductive plates 208 so that the water vapors are not required to traverse relatively large distances through the liquid water to escape into the space. In some embodiments, the water vapor outlet 212 connects to the pressure vessel 214 via a tube D. Tube E is also attached to tank 214 to ensure that any gas trapped in the water supply 226 is allowed to escape to pressure vessel 214 for use.

The amount and nature of current passed across the electrically charged plates is sufficient to agitate and modify chemical bonds of water molecules into unnatural bond angles but insufficient to break the covalent oxygen-hydrogen bonds. Nonetheless, due to the agitation and modification of bond angles of water molecules, the non-covalent bonding interactions between adjacent water molecules is disrupted and water across the surface of the electrically conductive plates convert into water vapors. The water flow across the surface of the plates facilitates the escape of water vapors created on the surface of the electrically conductive plates into the air. The creation of water vapors increases pressure in the chamber and generates a pressurized water vapor molecule with unnatural bond angles. The pressure build up helps maintain water molecules with unnatural bond angles.

The amount of water inside the chamber should be sufficient to completely immerse the electrically conductive plates 208. In one embodiment, the chamber is large enough such that even when the electrically conductive plates are completely submerged, a space exists above the water for the water vapors to escape into. A water vapor outlet orifice 212 can be positioned along the top of the chamber 202 leading to a pressure vessel 112. In embodiments with a water outlet orifice 228, the water outlet orifice 228 may be positioned along the chamber 202 such that the water level remains below the water vapor outlet 212. The water flow rate into the chamber should be approximately equal to the water flow rate out of the chamber so as to maintain a constant water level to keep the electrically conductive plates 208 submerged and to prevent water from entering into the water vapor outlet 212.

In another embodiment, a water vapor trap 108 is located above the water. The water vapor trap 108 may have a wide base to increase the area which the water vapor can escape into. The water vapor trap 108 may taper towards the top to funnel the water vapor in a desired direction. In embodiments with a water vapor trap 108, the water vapor outlet 212 can be positioned on the water vapor trap 108. In addition, the water vapor trap 108 may further comprise the water outlet orifice 228 to direct the water back to the water supply for recirculation. In another embodiment, the water vapor trap 108 can simply be the area above the level of the water.

The chamber 202 is connected to a pressure vessel 214 via the water vapor outlet 212. As the pressure builds up inside the chamber 202, the pressurized water vapor molecules are forced through the water vapor outlet 212 into the pressure vessel 214. The pressure vessel 214 may comprise a pressure gauge to determine the amount of pressure build up. The preferred amount of pressure to maintain water molecules with unnatural bond angles is approximately 1 pound per square inch (psi) to approximately 100 psi. However a higher pressure could be used for certain compressed gas applications. Contained at this pressure, the water molecule can maintain an unnatural bond angle for several months depending on the quality of the pressure vessel. The water molecules with unnatural bond angles can be released, for example, tube F for use in a variety of applications.

Due to the pressure build-up the chamber 202, pressure vessel 214, water trap 108, and water supply tank 104 should be made of material sturdy enough to maintain structural stability at high pressures. In addition, the material used may be non-corrosive such as metal, acrylic, PVC, plastic and the like. Preferably, the chamber 202 is made of stainless steel.

A non-conductive, non-water permeable coating may also be used to coat the inner surface of a metal chamber to increase the efficiency of energy production. A metal chamber may decrease the efficiency of water vapor production by shunting some of the electricity to ground. By coating the inner surface of a metal chamber with a non-conductive material, the electricity generated will remain in the electrically conductive plates. Suitable coatings include acrylic and fiber glass. A coating may be applied to the surface by, for example, sandblasting.

The apparatus may comprise a single chamber or a plurality of chambers. In embodiments with a plurality of chambers, each chamber would require the parts associated with the chamber. To share the water supply, maximize space, and increase efficiency, the chambers can be arranged in parallel. The power source can be attached to the plates of the different chambers in series or parallel as may suit the application. In addition, the water supply can flow into the chamber in parallel. This will allow the apparatus to share the same power source and water supply. A merging tube can be connected to each water outlet orifice and merge the water into a single vapor trap. The vapor trap can comprise its own water outlet orifice to recycle the water back into the water supply. The water vapors can also merge and collect in the water vapor trap and be forced through the water vapor outlet into a pressure vessel. This allows the water vapors generated in each chamber to combine together in a single pressure vessel.

It is believed that a water molecule with an unnatural bond angle can be created by exposing the water molecule to electromagnetic radiation of a wavelength greater than 0.1 cm and less than 100 cm. Preferably the electromagnetic radiation has a wavelength in the range of approximately 0.1 cm to approximately 100 cm. More preferably, the electromagnetic radiation has a wavelength of approximately 1 cm to 50 cm. In another embodiment, the electromagnetic frequency is between approximately 0 to approximately 5 gigahertz (GHz). In one embodiment, the electromagnetic frequency is approximately 1.1 GHz. In another embodiment, the electromagnetic frequency is approximately 2.2 GHz.

The electromagnetic radiation is applied through current. In one embodiment, the electromagnetic radiation may be applied as pulse width modulated direct current of unequal pulse spacing and reduced duty cycles. Therefore, although these ranges of wavelengths encompass microwaves, the mechanism of action differs from that of microwaves being applied with alternating currents as in the conventional microwave oven.

This invention is also directed towards a method of modifying a bond angle of a molecule, for example, generating a water molecule with an unnatural bond angle, comprising providing a first frequency; providing a second frequency different from the first frequency; generating a modifying frequency by combining or summating the first frequency and the second frequency; and exposing the molecule to the modifying frequency to create the unnatural bond angle without breaking the covalent bond.

The first frequency may be the intrinsic or inherent frequency generated by a power source. The second frequency may be the resonating frequency generated from the plurality of electrically conductive plates. The resonating frequency is approximately 50 Hz to approximately 40 KHz. In some embodiments, the resonating frequency is approximately 1 KHz to approximately 22 KHz.

Each electrically conductive plate comprises a surface area and is arranged parallel to each other. The power source and the electrically conductive plates effectively create a resistor-capacitor circuit. The current from the power source may be applied with a duty cycle of approximately 0.005 to approximately 0.5. The amount of power applied to the plurality of electrically conductive plates may range from approximately 10 watts per square feet of surface area to approximately 100 watts per square feet of surface area. In some embodiments, the power applied to the plurality of electrically conductive plates is approximately 30 watts per square feet of surface area to approximately 50 watts per square feet of surface area.

The method of generating a molecule, such as a water molecule, with an unnatural bond angle further comprises pressurizing the molecule with the unnatural bond angle to maintain the unnatural bond angle and containing the pressurized molecule with an unnatural bond angle in a pressure vessel.

Although this invention was described with respect to water as the molecule with an unnatural bond angle, the apparatus and methods described herein may be applied to other aqueous and non-aqueous solutions whose electromagnetic properties are conducive to similar processing. As such, this invention is also directed towards a molecule comprising an unnatural bond angle. Preferably, the molecule comprising an unnatural bond angle is pressurized. The unnatural bond angle is any bond angle other than a characteristic bond angle of a molecule in its natural state. For example, the bond angle of water in its natural state is approximately 104.5 degrees. Therefore, a water molecule with an unnatural bond angle is one a bond angle other than 104.5 degrees. For example, the bond angle may be greater than approximately 104.5 degrees. In some embodiments, the bond angle may be greater than approximately 109 degrees. In some embodiments, the bond angle may be 180 degrees.

It is believed that the reversion of a molecule with an unnatural bond angle back to its natural state with natural bond angles results in the release of energy. As such, numerous applications have been contemplated as listed below. One example is that a molecule with an unnatural bond angle may be used as an alternative fuel source. This can be accomplished by providing a molecule with an unnatural bond angle in a pressurized vessel at a pressure of approximately 1 psi to approximately 100 psi, then releasing the molecule with the unnatural bond angle from the pressurized vessel, and igniting the molecule with the unnatural bond angle with an electrical discharge. For example, a high frequency, high voltage ignition source such as a spark plug may be utilized. The ignition of the molecule with the unnatural bond angle reverts the unnatural bond angle back to a natural bond angle state and releases energy. Energy is released as sonic energy, mechanical energy, heat and chemical energy. In some embodiments, the energy released may be useable as an alternative fuel. The alternative fuel may be used as a replacement for gasoline for powering a motorized device, such as an automobile. In some embodiments, the energy released may be used to maintain a flame or fire.

EXAMPLES

Water vapors with unnatural bond angles were generated and captured in a pressure vessel at 35 psi by applying 5 volts to a generator comprising four parallel chambers with 20 plates in each unit; each plate having a surface area of 4 square feet and arranged parallel to each other with a gap of 0.1765 inches between plates. The pressurized vapor was regulated down to 5 psi and released through a cutting torch tip of the size #00 and ignited effectively creating a blowtorch, cutting torch, or welding torch. The flame generated was used to cut through many different materials including thin sheets of titanium and nickel plated steel. Also a tungsten welding rod was used as a sample metal and was melted by the cutting torch using water vapor with unnatural bond angles.

Water vapors with unnatural bond angles were generated and captured in a pressure vessel at 35 psi by applying 5 volts to a generator comprising four parallel chambers with 20 plates in each unit; each plate having a surface area of 4 square feet and arranged parallel to each other with a gap of 0.1765 inches between plates. The pressurized vapor was regulated down to 6 psi and injected into the intakes of two different types of single cylinder internal combustion engines. The two types of engines were a gasoline engine, a Honda GX 340, and a tri-fuel engine, a Honda GX 390. The modifications to the engines that allowed the insertion of the water vapor with unnatural bond angles was the removal of the carburetor and an insertion plate on the intake to allow only the water vapor with unnatural bond angles and not outside air to enter. This modification allowed these engines to start and run without any outside air or extra fuel other than the modified water vapor.

Figure 11:
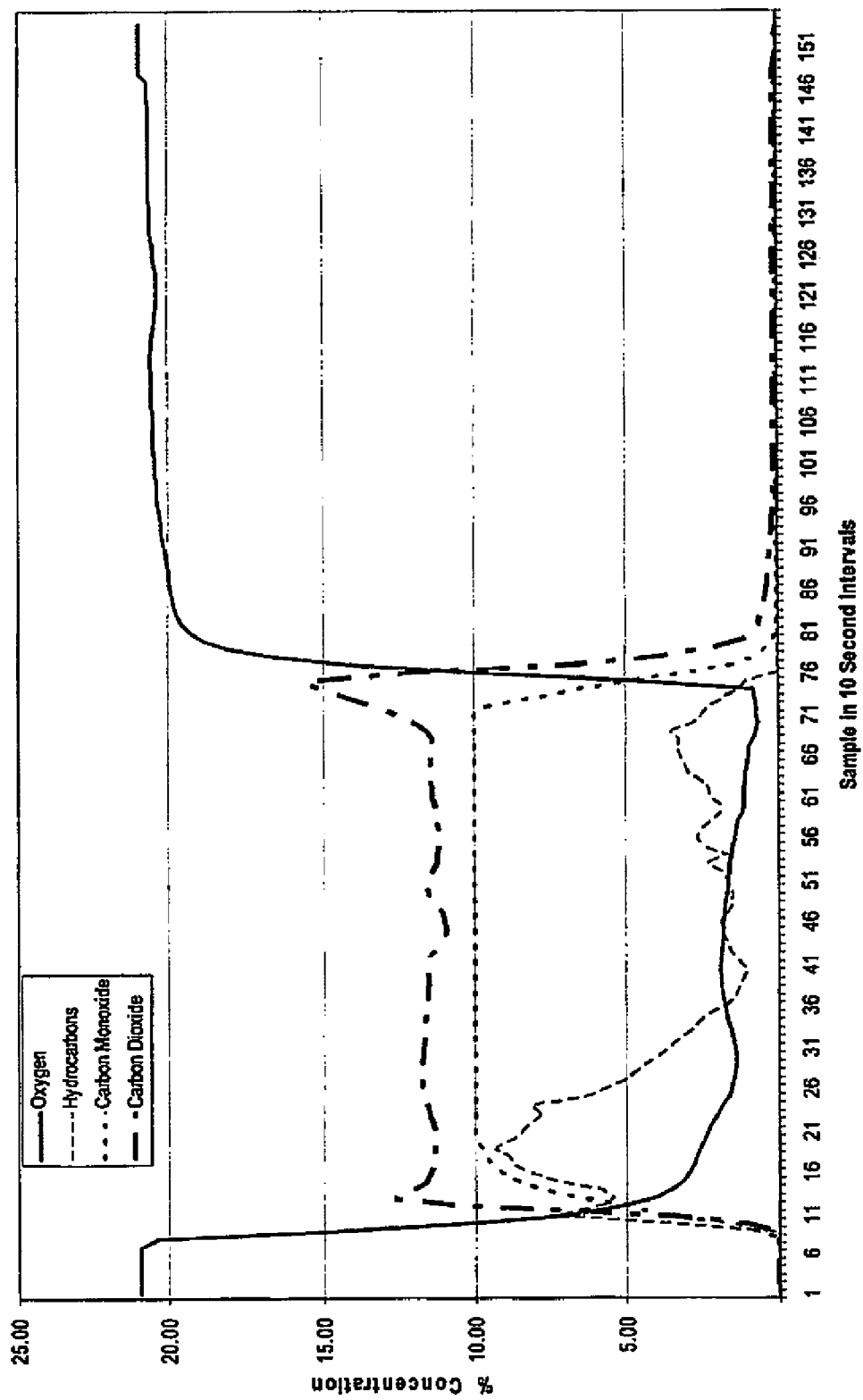
FIG. 11 is a graph of an experiment measuring the amount of various gases produced as a function of time in a standard automobile when switching from standard fuel to vapors with unnatural bond angles.

As summarized in FIG. 11, the pressurized vapor was also used to run an automobile with significantly reduced toxic byproducts. A Toyota FJ-40 with a 2-F straight six cylinder engine was modified such that the pressurized water vapor with unnatural bond angles was inserted below the carburetor in an extra port in the manifold intake using a ball valve as a shutoff and an automobile quick connect. Also a shutoff was installed in the engines normal gasoline line to allow a complete interruption of gasoline from the gas tank to the engine's carburetor. The engine was started and regular unleaded car gasoline was used to keep the motor running. The levels of gases emitted from the tailpipe were measured in 10 second intervals by the IMR 2800A Exhaust Gas Analyzer and the results are shown in FIG. 11. Data points 1 through 71 indicate conditions when regular unleaded gasoline was used. Oxygen levels in the air were above 20% before ignition and dropped to less than 5% within 3 minutes. Levels of hydrocarbons, carbon monoxide, and carbon dioxide where virtually undetectable before ignition and rose to approximately 10% or more. After approximately 12 minutes, the fuel source was switched from the unleaded gas to the vapor described as this invention (see Data points 72-78 in FIG. 11). Approximately 1 minute after switching to the vapor, the engine was running on pure vapors (data points 79-147 in FIG. 11). As shown, oxygen levels in the air had return to normal at above 20% and hydrocarbon, carbon monoxide, and carbon dioxide levels returned back to undetectable levels. The engine, however, was still running. After an additional 11 minutes, the engine was turned off (data points 148 to 154) and the levels of oxygen, hydrocarbons, carbon monoxide, and carbon dioxide remained unchanged compared to levels when the engine was running on the vapors.

Figure 12:
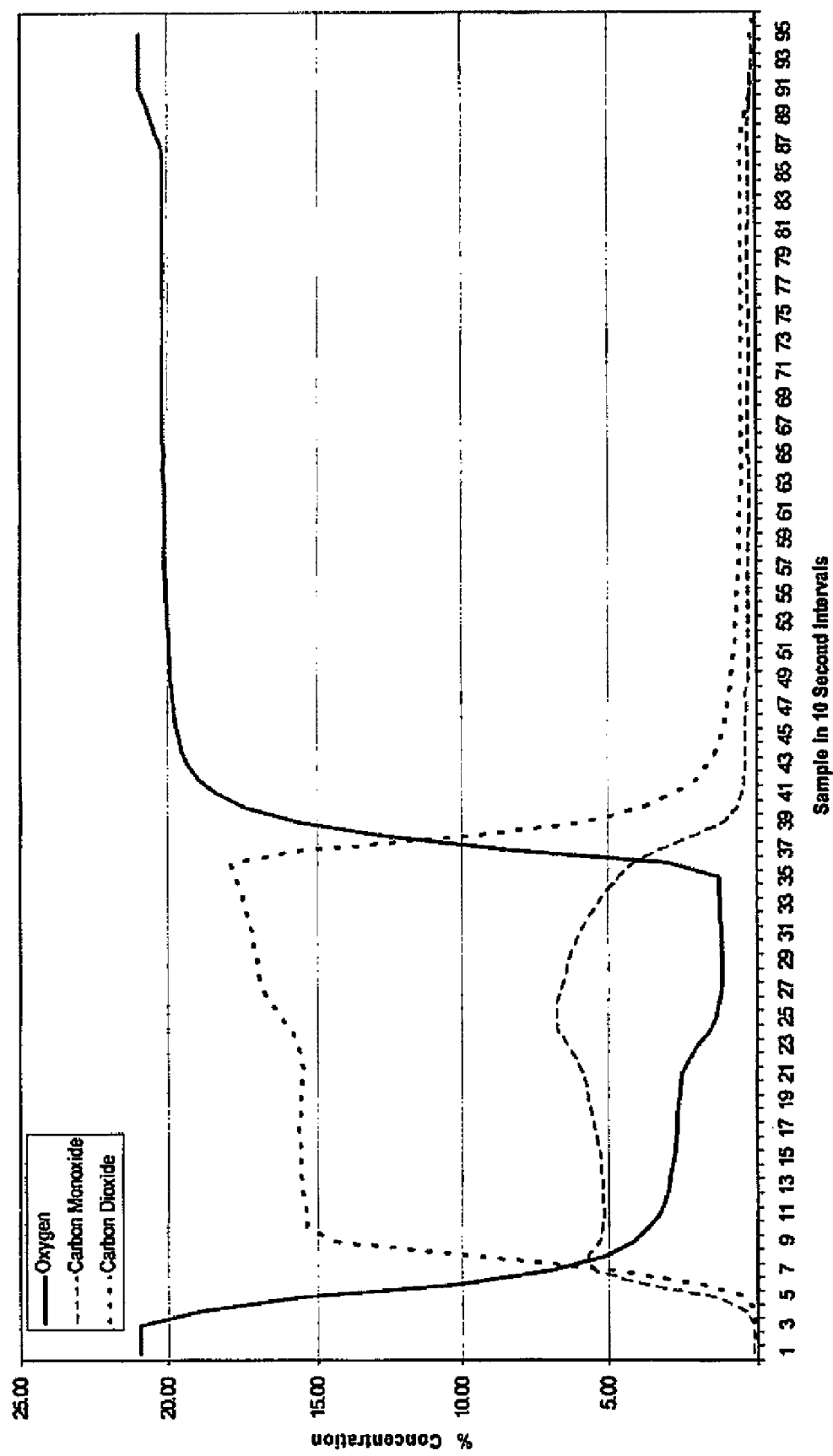
FIG. 12 is a graph of another experiment measuring the amount of various gases produced as a function of time in another automobile when switching from standard fuel to vapors with unnatural bond angles.
Figure 13:
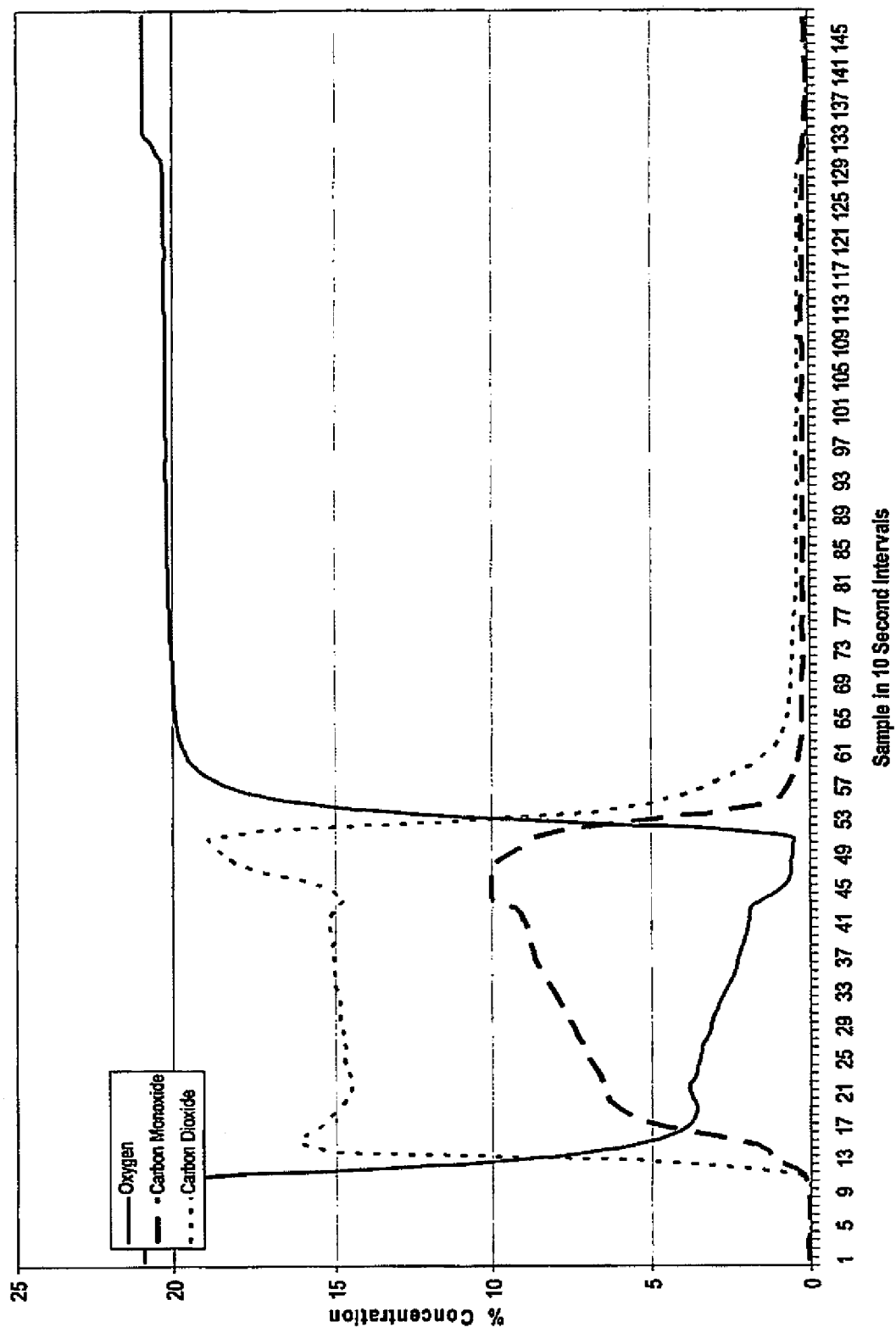
FIG. 13 is a graph of another experiment of the amount of various gases produced as a function of time in a standard automobile when switching from standard fuel to vapors with unnatural bond angles.
Figure 14:
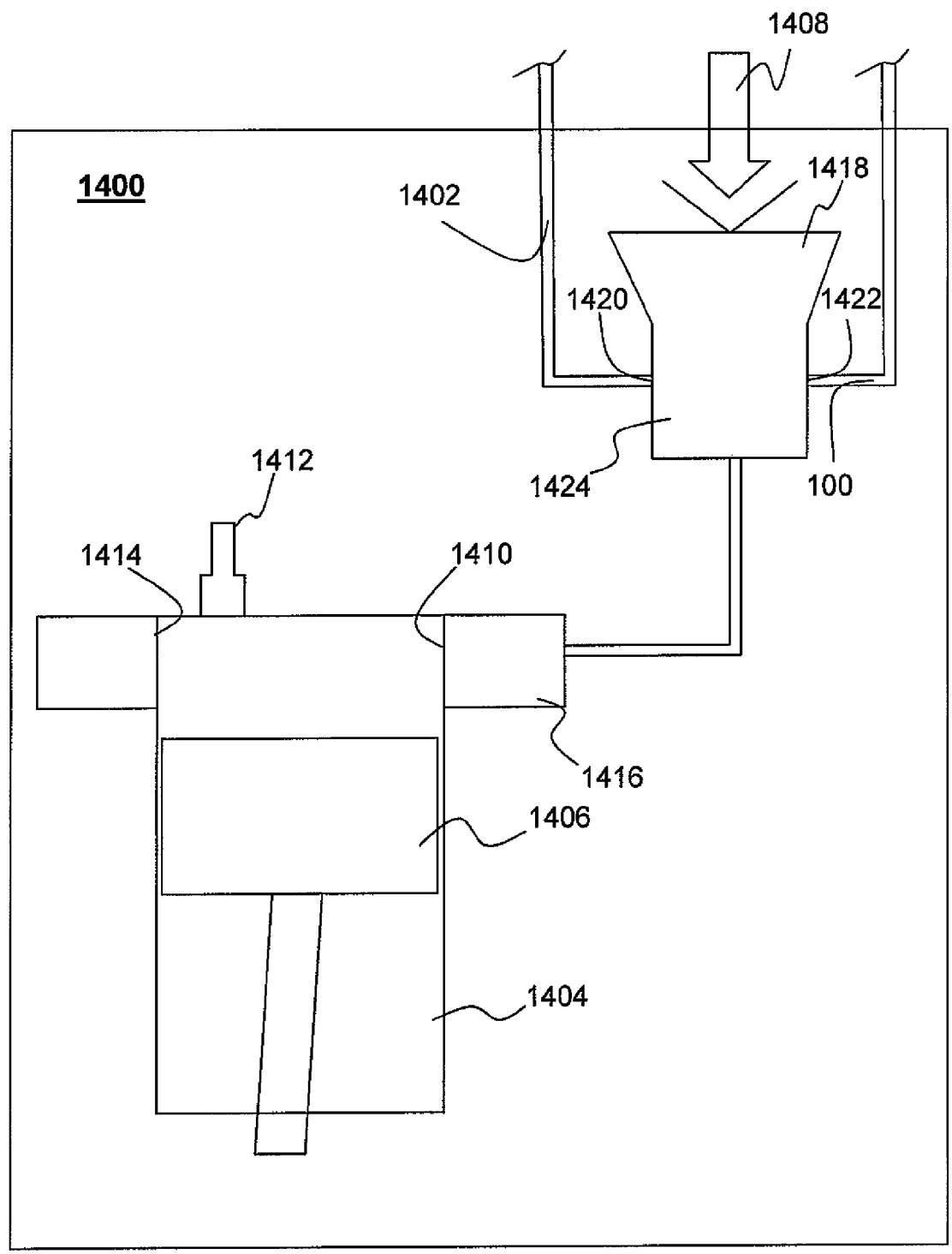
FIG. 14 is a block diagram of an embodiment of an engine modified to use the vapor molecules with unnatural bond angles.

This experiment was repeated two more times and the results have been reproduced in FIGS. 12 and 13 with similar results. As shown in FIG. 12, when the engine was turned on using unleaded gasoline oxygen levels in the air dropped from above 20% to below 5% (data points 1-35) and toxic gas levels rose from undetectable levels to over 5% (carbon monoxide) and 15% (carbon dioxide). When the fuel was switched from unleaded gasoline to the vapor, oxygen levels rose back to approximately 20% while toxic gas levels dropped back to below 1% (data points 43-87). When the engine was turned off, oxygen levels remained unchanged and toxic gas levels decreased to undetectable levels.

FIG. 13 shows the third experiment with oxygen levels dropping from above 20% when the engine was off to below 5% when the engine was turned on using unleaded gasoline. Carbon monoxide and carbon dioxide rose from undetectable levels when the engine was off to levels exceeding 5% and 15%, respectively, when the engine was running on unleaded gasoline (data points 1-36 in FIG. 13). After the fuel was switched from unleaded gasoline to the vapor described herein, the levels of oxygen rose back up to approximately 20% and the toxic gases dropped to undetectable levels (data points 51-129 in FIG. 13). After the engine was turned off gas levels were unchanged compared to when the engine was running on the vapor (data points 130-150 in FIG. 13).

Application

One application of vapor molecules with unnatural bond angles ("the vapor molecules") 100 is as an alternative fuel source for engines and motor vehicles, such as automobiles, as well as other motorized devices relying on fuel for power. For example, conventional fuels used in internal combustion engines, such as gasoline, diesel, natural gas, propane, and the like can be replaced, in whole or in part, with the vapor molecules 100. The vapor molecules 100 can replace from about 0% to about 100% of the conventional fuel. Utilizing the vapor molecules 100 reduces toxic emissions associated with the burning of gasoline and other fuels.

Replacement of conventional fuels with vapor molecules 100 may be accomplished by a variety of methods depending on the type of engine. For example, as shown in FIGS. 14-18, in an internal combustion engine 1400, the vapor molecules 100 may be free flowing into the intake manifold 1416, injected directly into the cylinders 1404, or mixed and metered with air and/or fuel prior to delivery to the cylinders 1404.

By way of example only, the vapor molecules 100 can be used in conjunction with or as a replacement for fuel 1402 in a standard internal combustion engine 1400. The internal combustion engine 1400 combusts fuel 1402, such as gasoline, inside a cylinder 1404 to drive pistons 1406 to power a motorized vehicle 1800. In a standard four stroke internal combustion engine 1400, fuel 1402 and air 1408 are drawn into the cylinder 1404 through an intake valve 1410 as the piston 1406 moves to the bottom of the cylinder 1404 during the first stroke or intake stroke. During the second stroke or compression stroke, the fuel 1402 and air 1408 are compressed as the piston 1406 moves towards the top of the cylinder 1404. In the third stroke or combustion stroke, the fuel 1402 and air 1408 inside the cylinder 1404 are ignited by a spark plug 1412 and combusts, thereby driving the piston 1406 towards the bottom of the cylinder 1404. In the fourth stroke or exhaust stroke, the piston 1406 moves back up and the exhaust is eliminated through an exhaust valve 1414.

Since the vapor molecules 100 can also release energy when actuated, ignition of the vapor molecules 100 inside a cylinder 1404 would have a similar effect as ignition of the fuel 1402 and air 1408 mixture. The engine 1400 may be modified to feed vapor molecules 100 into the cylinder 1404. Various techniques may be employed to feed the vapor molecules 100 into the cylinder 1404 during the intake stroke. Some of the techniques and methods include, but are not limited to, free flow of vapor molecules 100 into the intake manifold 1416, metered flow of the vapor molecules 100 and air 1408 in an appropriate ratio, and direct injection of the of the vapor molecules 100 into the cylinder 1404. Once in the cylinder 1404 the vapor molecules 100 may be ignited, for example by a spark plug 1412, the combustion of diesel fuel in a diesel engine, or any other source of a spark or flame. In test experiments, a vapor molecule 100 to diesel fuel ratio of 60:40 and even up to 70:30 still allowed the diesel fuel to combust upon compression to actuate the vapor molecules to release energy.

In some embodiments, there may be a free flow of the vapor molecules 100 into the cylinder 1404 via the intake manifold 1416. In vehicles using carburetors 1418, the carburetor 1418 has a fuel inlet 1420 through which the fuel is drawn into the intake manifold 1416, mixed with air 1408, and introduced into the cylinder 1404. An alternative fuel or vapor molecule inlet 1422 can be created through which the vapor molecules 100 can be introduced to the fuel/air mixtures. This vapor molecule inlet 1422 may be aligned with, adjacent to, or opposite from the fuel inlet 1420 so that the fuel 1402 and vapor molecules 100 are drawn into the venturi 1424 of the carburetor 1418. Thus, when the throttle valve (not shown) of the carburetor 1418 is opened, air 1408, fuel 1402, and vapor molecules 100 are sucked into the manifold 1416 for distribution into the cylinders 1404.

Figure 15:
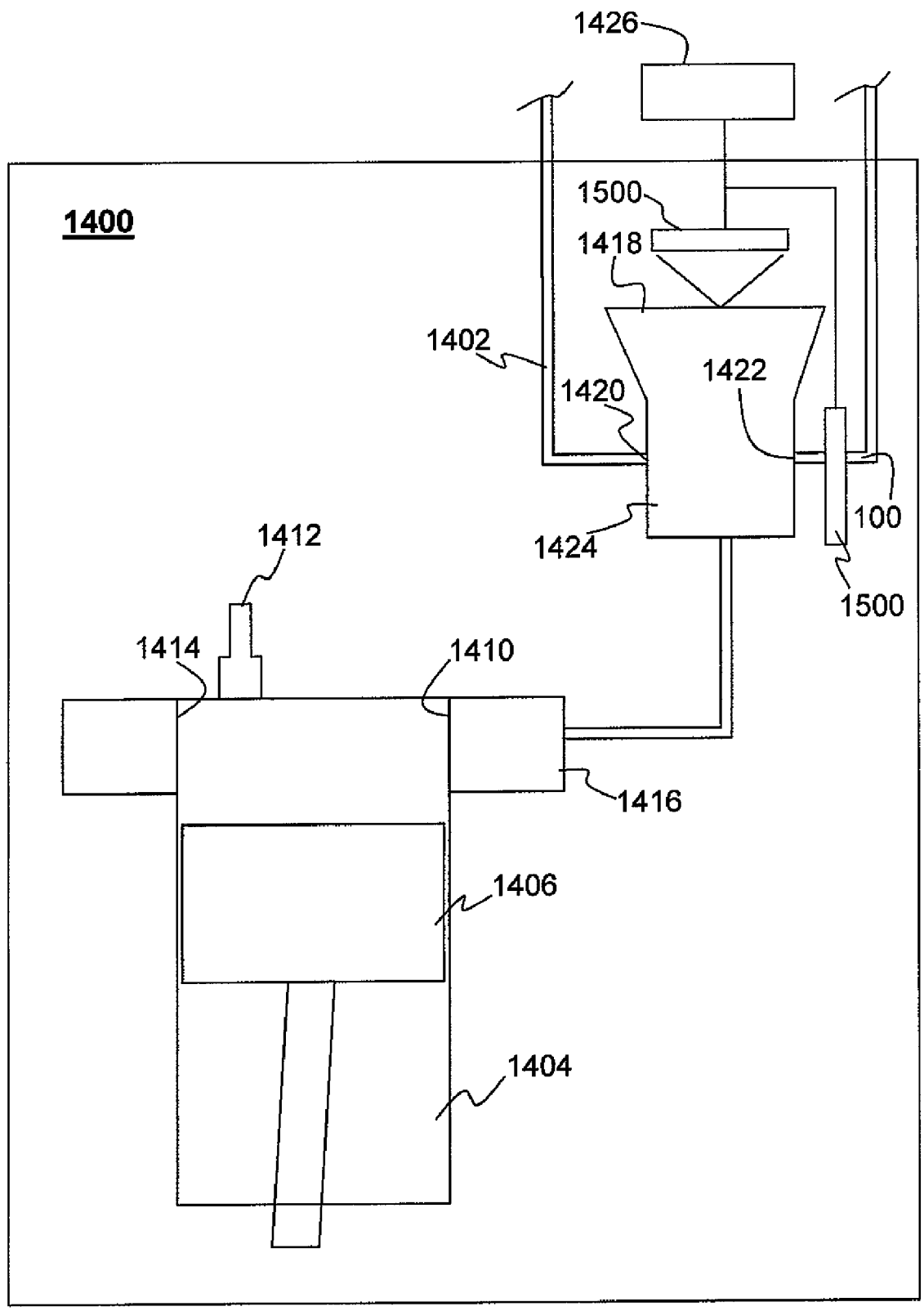
FIG. 15 is a block diagram of another embodiment of an engine modified to use the vapor molecules with unnatural bond angles.
Figure 16:
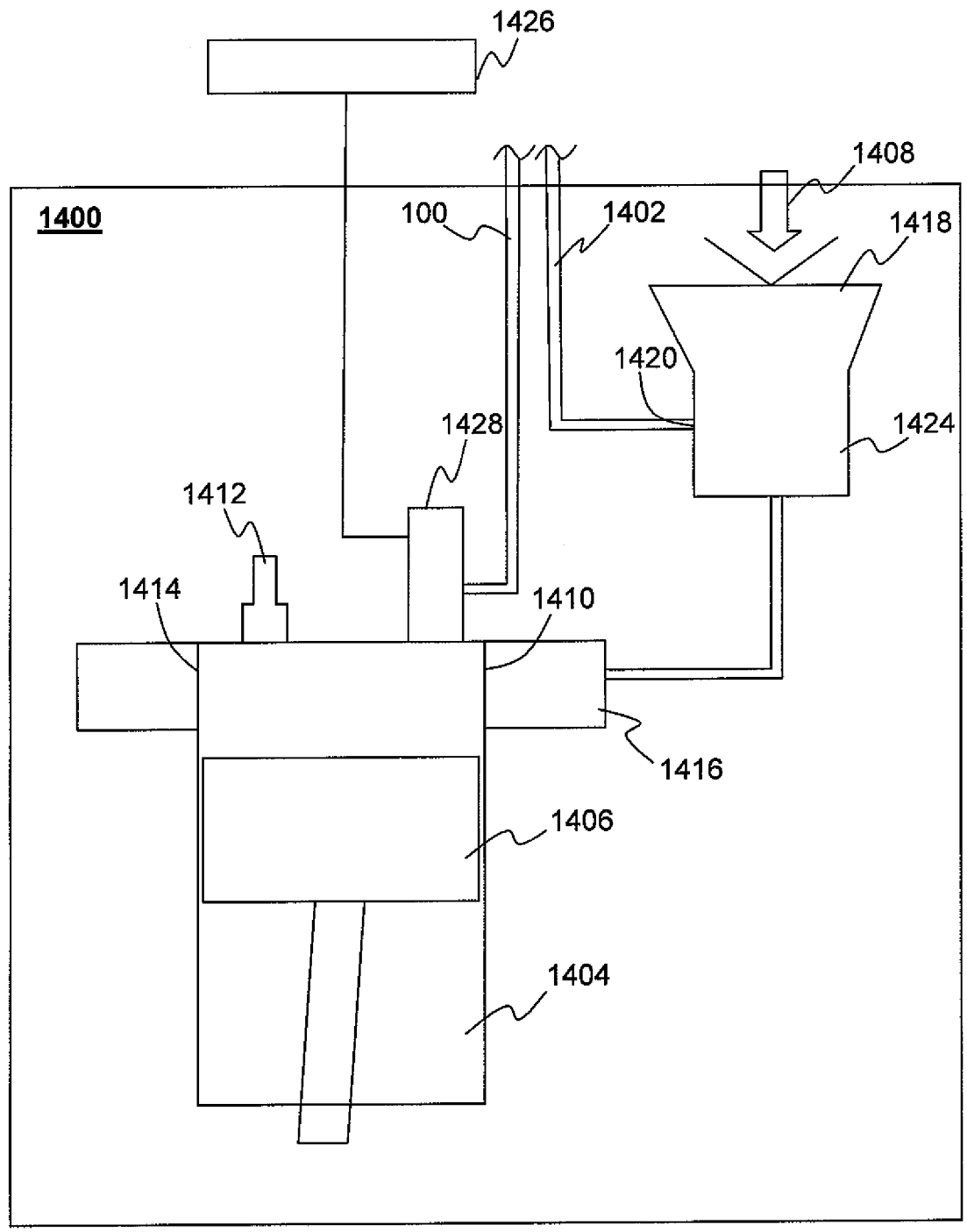
FIG. 16 is a block diagram of another embodiment of an engine modified to use the vapor molecules with unnatural bond angles.
Figure 17:
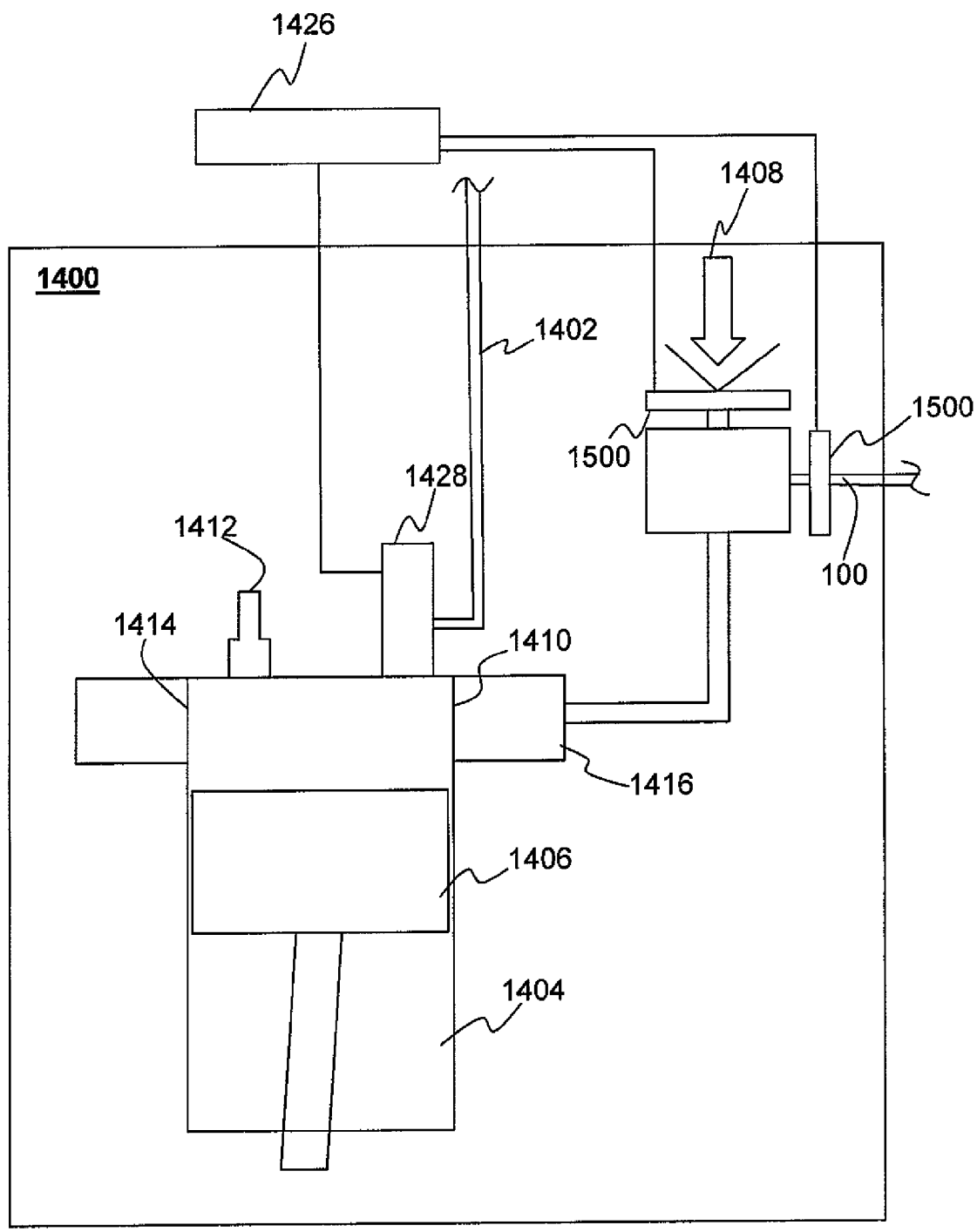
FIG. 17 is a block diagram of another embodiment of an engine modified to use the vapor molecules with unnatural bond angles.
Figure 18:
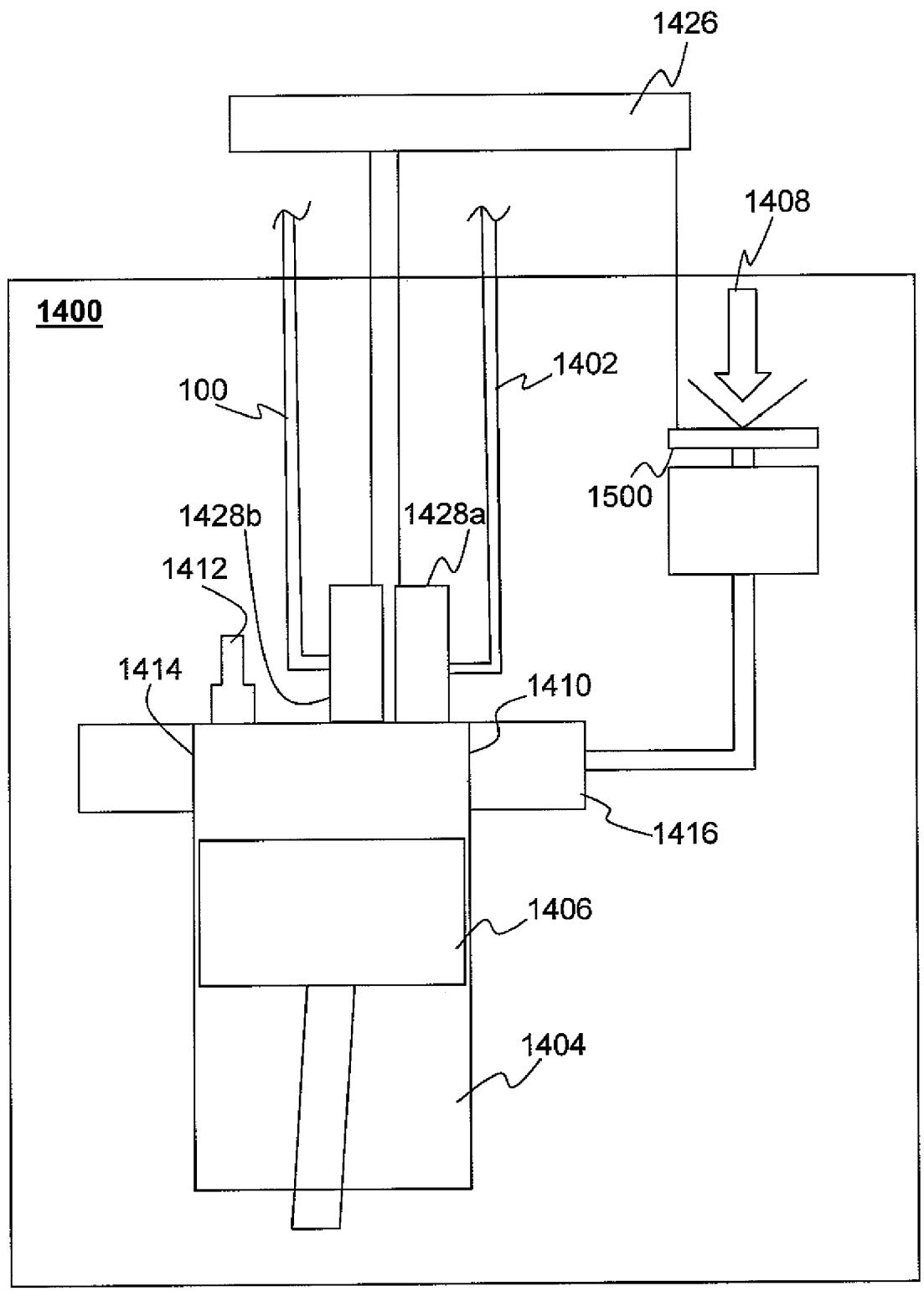
FIG. 18 is a block diagram of another embodiment of an engine modified to use the vapor molecules with unnatural bond angles.

In some embodiments, air flow 1408 through the carburetor 1418 and/or the introduction of the vapor molecules 100 to the intake manifold 1416 may be controlled or metered using a mass flow controller 1500, valves, fuel injectors, and the like as shown in FIGS. 15 and 17. These may work in conjunction with the vehicle's computer system 1426.

In embodiments in which the carburetor 1418 has been replaced with the fuel injector 1428, a second fuel injector 1428b may be employed to inject the vapor molecules 100 into the intake system 1416 or directly into the cylinder 1404. A computer system 1426 can synchronize and calculate the proper mixture of fuel 1402, air 1408, and vapor molecules 100 to inject into the intake system 1416 and/or the cylinder 1404.

In some embodiments, the carburetor 1418 may be used in conjunction with the fuel injector 1428. For example, fuel 1402 may be introduced into the cylinder 1404 via the fuel injector 1428 while the vapor molecule 100 is introduced into the cylinder 1404 via the carburetor after mixing with the air. Alternatively, the vapor molecule 100 may be directly introduced into the cylinder 1404 via a fuel injector 1428 while the fuel is introduced via the carburetor 1424 after having been mixed with air. In addition, an option may be provided to completely shut off the introduction of fuel 1402 into the cylinder and rely completely on the vapor molecule 100.

By way of example only, in an embodiment using both a carburetor 1418 and fuel injector 1428, with the fuel 1402 entering the cylinders 1404 through the fuel injector 1428 and the vapor molecules 100 entering the cylinders 1404 via the carburetor, if fuel is no longer desired, a switch can shut off the fuel injector 1428 so that the vehicle is powered solely by the vapor molecules 100.

Therefore, a variety of different combinations may be employed for introducing the vapor molecule and/or fuel into the cylinder. The precise approach used may depend on fuel savings or power. Therefore, the vapor molecules 100 and/or the fuel 1402 may be injected directly into the cylinder 1404 or through an existing intake system 1416. In utilizing an existing intake system 1416, the flow of the vapor molecules 100 may be controlled or free flowing. In addition, the vapor molecules 100, the fuel 1402, and air 1408 may be mixed before entering the cylinder 1404 or mixed inside the cylinder 1404 through parallel injections via electrical injectors, mechanical injectors, solenoid valves, and the like, or mixed in any combination prior to or during the introduction into the cylinder 1404.

Figure 19:
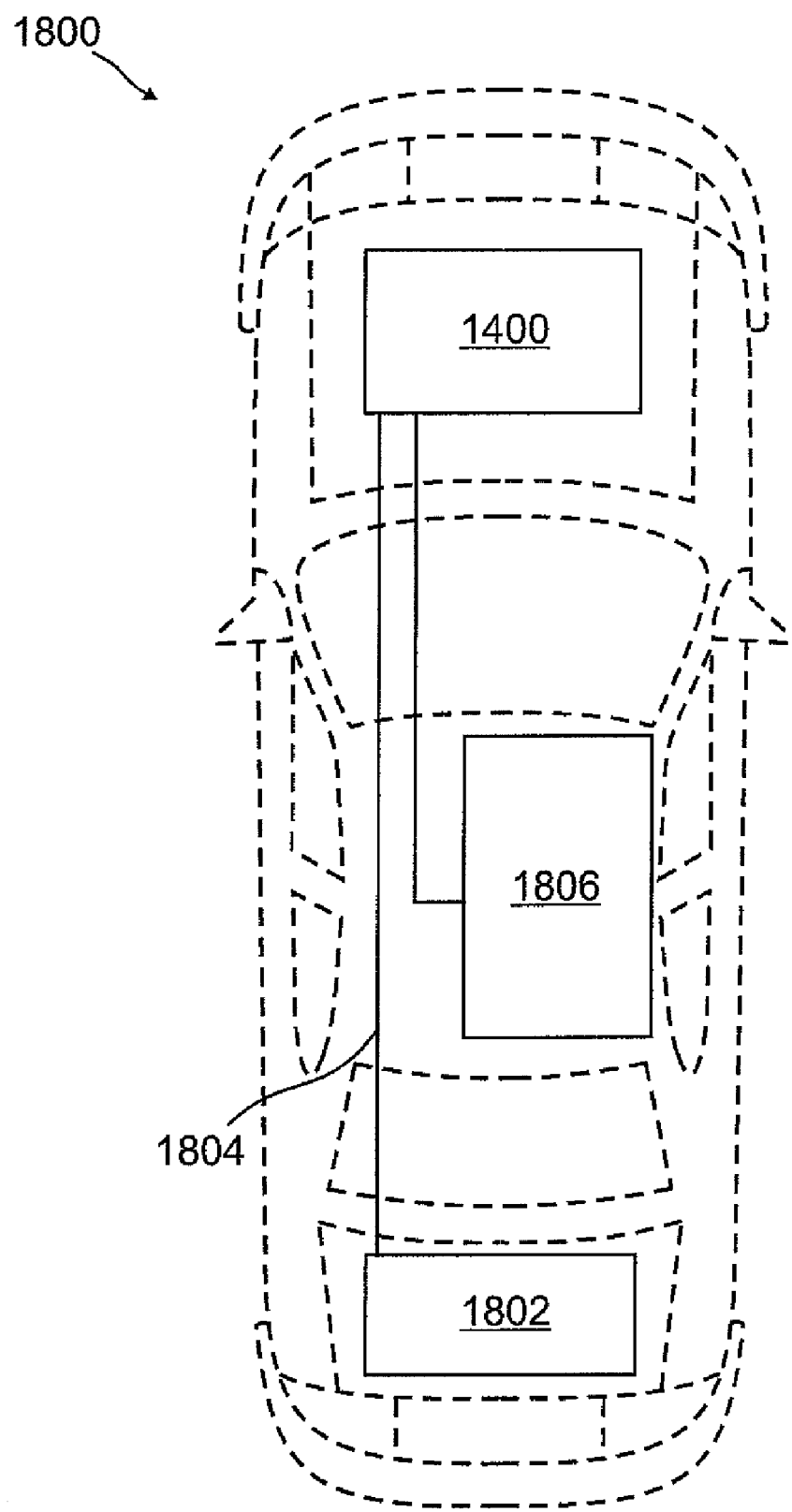
FIG. 19 is a plan view of a vehicle modified to use the vapor molecules with unnatural bond angles as an alternative fuel.

As shown in FIG. 19, the vapor molecules 100 may be stored in a vehicle 1800 in a storage container 1802. For example, the storage container 1802 may be a pressurized vessel 214 containing the vapor molecules 100 placed in or near the trunk of the vehicle 1800. A high pressure hose or line 1804 can connect the storage container 1802 to the intake system 1416 or directly into the cylinders 1404 to deliver the vapor molecules 100 at the appropriate time and in the appropriate amount. Thus, a fuel tank 1806 and the storage container 1802 may work in parallel.

In some embodiments, the storage container 1802 may be a vapor molecules generator 102 placed in the vehicle 1800.

Since water may be used as one of the fluids to generate the vapor molecules 100, a user need only find a source of water to "re-fuel" the vehicle 1800. Furthermore, since the fluid need not be in pure or filtered form, the user could stop nearly anywhere and use nearly any type of fluid or water that can be found.

Figure 20:
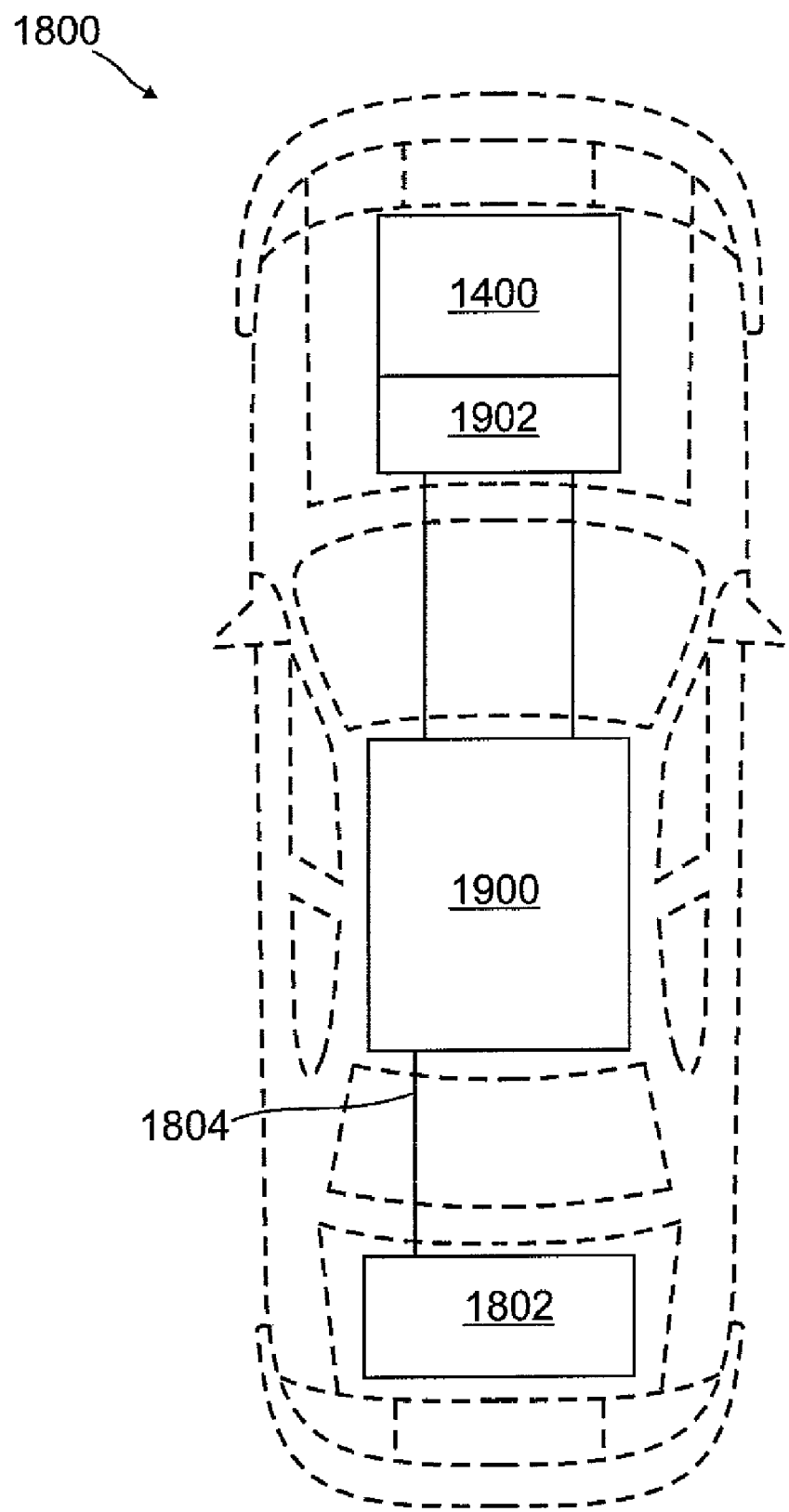
FIG. 20 is a plan view of another embodiment of a vehicle modified to use the vapor molecules with unnatural bond angles as an alternative fuel.

As shown in FIG. 20, the vapor molecules 100 may also be used in conjunction with current alternative fuel vehicles. For example, the vapor molecules 100 may be fed into fuel cells 1900 to power the fuel cell 1900 in electric vehicles 1800. The fuel cell 1900 can then power the batteries or an electrical generator 1902 to provide power to the engine 1400 or electrical power for use to power other electrical devices. In some embodiments, the vapor molecules 100 may be used to directly power an electrical generator to provide power to any electrical or electromechanical device. The vapor molecules 100 may be from a pressurized vessel 214 or generated in the vehicle by a vapor molecules generator 102.

Thus, as described herein, the present invention is also a method of powering an engine 1400, such as the engine of a motorized vehicle comprising introducing vapor molecules with unnatural bond angles ("vapor molecules") 100 into the engine 1400, and actuating the vapor molecules 100 to create kinetic energy. Preferably, the vapor molecules 100 are water molecules with an unnatural bond angle of greater than approximately 104.5 degrees.

Specifically, the method of powering an engine 1400, comprises introducing vapor molecules 100 into a cylinder 1404 of an engine 1400; and actuating the vapor molecules 100 to drive a piston 1406. The method further comprises feeding the vapor molecules 100 into the cylinder 1404 from a storage container 1802. In some embodiments, the storage container 1802 may be a pressurized vessel 214. In some embodiments, storage container 1802 generates the vapor molecules 100. Thus, the storage container 1802 may be a vapor molecule generator 102.

The vapor molecules 100 may be introduced into the cylinder 1404 through an intake valve 1410, injected directly into the cylinder 1404, or metered into the intake manifold 1416 by a mass flow controller 1500. In addition, the vapor molecules 100 may be mixed with a fuel 1402. In some embodiments, the vapor molecules 100 and the fuel 1402 are mixed before introduction into the cylinder 1404. In some embodiments, the vapor molecules 100 and the fuel 1402 are mixed in the cylinder 1404.

In some embodiments, the engine 1400 may be an internal combustion engine and the method of powering the internal combustion engine comprises generating vapor molecules with unnatural bond angles 100 in a storage container 1802 inside a motorized vehicle 1800, metering vapor molecules 100 into an engine 1400 with a first mass flow controller 1500a, metering air flow into the engine with a second mass flow controller 1500b, mixing the vapor molecules, air, and a fuel in a compartment of the engine, such as the carburetor 1418, intake manifold 1416, or the cylinder 1404, and actuating the vapor molecules 100 inside the cylinder 1404 to drive a piston 1406 to create work.

Implementation of this method into vehicles results in an alternative fuel vehicle 1800, comprising an engine 1400, the engine 1400 comprising a cylinder 1404, and a piston 1406 housed inside the cylinder 1404; and an alternative fuel comprising vapor molecules with unnatural bond angles 100, wherein the alternative fuel 100 is introduced into the cylinder 1404 of the engine 1400 and actuated to release energy to drive the piston 1406 inside the cylinder 1404.

The alternative fuel vehicle 1800 further comprises a means for introducing the alternative fuel 100 into the cylinder 1404. For example, the alternative fuel vehicle 1800 may have a first fuel injector 1428a to inject a fuel 1402 into the cylinder 1404; and a second fuel injector 1428b to inject the alternative fuel 100 into the cylinder 1404. The second fuel injector 1428b may be positioned on the cylinder in a similar manner as the first fuel injector 1428a. In some embodiments, the alternative fuel vehicle 1800 may have a standard carburetor 1418, the carburetor 1418 comprising a throttle body having a first end and a second end; a channel within the throttle body extending from the first end to the second end, the channel having a wall; a throttle plate positioned at the second end, the throttle plate rotatable within the channel; a fuel inlet 1420 within the wall of the channel to introduce the fuel into the carburetor; and an alternative fuel inlet 1422 within the wall of the channel to introduce the alternative fuel into the carburetor to mix with the fuel.

In some embodiments, the alternative fuel vehicle 1800 further comprises a mass flow controller 1500 to meter an amount of the alternative fuel 100 into the cylinder 1404.

The alternative fuel vehicle 1800 may also have a storage container 1802 and a line 1804 connecting the storage container 1802 to the engine 1400. In some embodiments, the storage container 1802 is a pressurized vessel 214. In some embodiments, the storage container 1802 generates the vapor molecules with unnatural bond angles 100. In other words, the storage container 1802 is a vapor molecule generator 102.

Other Applications

Numerous other applications have been contemplated by the inventors. The following is not an exhaustive list of possible applications but rather a few examples in various fields to provide a sample of the potential uses.

Water
 Water Treatment Systems for Culinary/Commercial Uses—Saline/Brackish
 Water for Injectables—Medical
 Semi-conductor Manufacturing Water
 Reclamation of Useful or Valuable Substances from Water
 Mine Waste Water Treatment
 Food Product Water
 Reclamation of Industrial Waste Water and Contents
 Reclamation of Grey Water for Agriculture, Recreation
Energy (Electrical)
 Air Quality Improvement for Existing Facilities by Pollutant Capture Including Coal
 Reduce/Eliminate Hydrocarbon Fuel Requirements
 Reduce/Eliminate Greenhouse Gas Emissions
 Utilize Water/Gravity Systems in Electrical Energy Production
 Utilize Charged Gas Systems in Electrical Energy Production
 Bring Shut-in Plants On-Line—Can Meet Air Quality Requirements
 Personal Transportation
 Retrofit Existing Internal Combustion Engines for New Fuel
 Retrofit Existing Internal Combustion Engines to Capture Carbon Based Emissions
 Retrofit to Eliminate Nitric Oxide, Sulfur Dioxide, Particulate Emissions
 New Engine Designs to Optimize Use of New Fuel
 Internal and External Combustion Engines
 Mass Transportation
 Retrofit Buses etc. to Reduce Hydrocarbon Use and Emissions
 Retrofit Trains to Reduce Hydrocarbon and Emissions
 New Engines to Optimize Environmental, Efficiency, Safety for both Internal and External Combustion Engines
 Commercial Transportation
 Retrofit Over the Road Trucks Reduce Hydrocarbon Use
 Reduce Emissions, Noise
 New Internal and External Combustion Engines
 Harvest, Store, Distribute Excess Energy
 Maritime
 Retrofit Marine Engines to reduce Hydrocarbon Use and Emissions
 Reduce Emissions While in Port Areas
 Provide Fresh Water for On-board Use
 Reduce Need to Carry Ice to Cool Fish Cargo
 Increase Effective Time at Sea
 Reduce Cost, Hydrocarbon, Emissions for On-Board Generation of Ship's Power
 Reduce Pollution at Sea from Hydrocarbon Use, Cargo
 Increase Effective Range
 Increase Effective Cargo Capacity
 "Pull Push" Propeller Free Low Draft Propulsion and Maneuvering System
Energy (Hydrocarbon)
 Capture and Utilize Emissions from Coal Powered Plants Eliminating $CO_2$
 Reduce/Eliminate Use of Fuel Oil and Natural Gas Eliminating CO2
 Enable Hydrocarbon Production from Oil Shales and Sands
 Utilize Excess Hydrocarbons in Production of Plastics, Pharmaceuticals, Chemicals, etc.
Energy (Nuclear)
 Replacement of Nuclear Fuel Rods in Existing Reactors Reduction of Nuclear Waste Materials Treatment of Reactor Cooling Water
Chemistry
 High Purity Gases
 Inorganic/Organic Chemical Synthesis
 High Temperature Chemistry in Vacuum Over Long Periods
 Reductive Purification of Metals (Aluminum, etc.) without Carbon
 Multi-Frequency Redox Reaction Chemistry in Vacuum or Atmosphere
 Chemical Reactions in Extreme Conditions
Physics
 Sustained Plasma Reactions in Vacuum and Near Vacuum Conditions
 Reactions in Electron Rich Conditions—Heat—Vacuum
 Spectroscopy
 Time/Space Continuum Phenomenon
 Ion/Plasma Propulsion Systems for Deep Space
 Real Time Elemental Analysis
 Materials Testing
 High Temperature Synthetic Crystal Growth
Metallurgical
 High Temperature Assaying and Testing
 High Temperature Production and Refining in Vacuum
 Reduction of Carbon Emissions from Heating Operations
 Elimination of Storage of Dangerous Gases
 Electrical Energy Reduction
 Real Time Monitoring and Control of Pyrometallurgical Processes
 High Temperature Operations Without Electrical and Magnetic Field Generation
Heat, Cooling, Refrigeration
 Residential and Commercial Heating—Reduction/Elimination Carbon Fuels
 Air Conditioning
 Large Scale Refrigeration Reduced Electrical Consumption
Air Quality Maintenance
Public Safety
Aircraft Oxygen Systems
Firefighter Breathing Apparatus
Portable Oxygen Apparatus
Non-destructive Stun Grenade
Fire Control/Extinguishment
Precision Metal Cutting Apparatus, Small, Portable, Quick
Decontamination, Detoxification Systems
Large Scale Anti-bacterial Systems
Crowd Control
Recreation
Tankless Underwater Breathing Apparatus
Special Effects
Personal Watercraft/ATV Propulsion
Lighter than Air Craft
Small Scale Water, Electrical, Waste Systems for Recreational Use
  Military (Defensive Only)
  "Caterpillar Drive" for Submarine Use
  Water Thrust Surface Propulsion System
  Remote Observation Propulsion
  Lighter than Air Craft
  Mine Clearance
  Disorientation Devices
  Tunnel and Bunker Destruction
  Covert Naval Vessel Destruction
  Extra-atmospheric Power, Water, Light, Oxygen, Propulsion Systems from Water or Ice
  Rocket Fuel—Non-explosive
  Vehicle Fuel—Non-combustive
  Hydrocarbon Free Torpedo Propulsion
  Reduces Fuel Transportation, Delivery Hazards and Time
  Food Processing
  Reduction/Elimination of Harmful Organisms through Cell Membrane Rupture
  Container Size Flash Freezing/Refrigeration
  Large Scale Anti-Bacterial Systems Vacuum Packaging systems
  Industrial
  Welding and Cutting Like and Unlike Materials
  Vibration and Shock Testing
  Sustained Heat in Vacuum
  Vacuum Based Burn-in Systems
  Simplified Liquid Pumping Systems Over Long Distances
  Large Scale Vacuum Pumps
  Environmental
  Reclamation of Atmospheric Pollutants for Product Synthesis
  Reduction of Carbon Footprints Across the Board
  Creation of Carbon Credits to Fund Environmental Programs
  Reduce Destruction of Environment by Carbon Based Pollutants
  Reduce Need to Harvest Trees, Burn Rain Forest
  Atmospheric Oxygen Enrichment
  Agricultural
  Atmospheric Nitrogen Fixation
  Low Cost Pumping Systems with Reduced Moving Parts
  On-site Fertilizer Production
  Food/Feed Preservation
  Pest Control
  Reduce/Eliminate Hydrocarbon Fuel Use—Carbon Emissions
  Reclamation of Soil Fouled by Irrigation Residue
  Reclamation—Recycling of Fertilizer from Irrigation Run-off Water
  Waste Management
  Human Waste Management
  Industrial Waste Management
  Medical Waste Management
  Toxic Waste Management
  Sewage Treatment
  Large Scale Waste Disposal
  Portable Trash and Waste Management Equipment
  Waste Recycling/Reclamation Systems
  Methane Synthesis to Liquid Fuels, Solvents, Industrial Products
  Run-off Water Treatment
  Petroleum Industry
  Repressurization of Reservoirs to restore Oil Production—Avoids New Drilling
  Reclamation of Water from Oil/Water Mix at Wellhead
  Recovery of Carbon Dioxide for Ethanol Synthesis
  Down Hole Hydrogenation of Petroleum Products
  Reclamation of Drilling Mud Water
  Enable Hydrocarbon Production from Oil Bearing Shales and Sands
  Miscellaneous
  Echo Ranging for Geological Structural Analysis
  Extreme Depth Water Measurement
  Sea Floor Mapping at Extreme Depth
  Eliminate Gas Transportation Hazards—Point of Use Generation The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

INDUSTRIAL APPLICABILITY

This invention may be industrially applied to devices and methods for generating alternative fuel sources, in particular, converting water into a viable alternative fuel source, for use in engines, such as the internal combustion engine.

What is claimed:

1. A method of powering a motorized vehicle comprising:
  a. generating water vapor molecules with unnatural bond angles greater than approximately 104.5 degrees ("vapor molecules") in a storage container inside a motorized vehicle;
  b. metering vapor molecules into an engine with a first mass flow controller;
  c. metering air flow into the engine with a second mass flow controller;
  d. mixing the vapor molecules, air, and a fuel in a compartment of the engine selected from the group consisting of a carburetor, an intake manifold, and a cylinder; and
  e. actuating the vapor molecules inside a cylinder to drive a piston to create work.

2. A method of powering an engine, comprising:
  a. introducing water vapor molecules with unnatural bond angles greater than approximately 104.5 degrees ("vapor molecules") into a cylinder of an engine; and
  b. actuating the vapor molecules to drive a piston.

3. The method of claim 2, further comprising feeding the vapor molecules into the cylinder from a storage container.

4. The method of claim 3, wherein the storage container is a pressurized vessel.

5. The method of claim 3, wherein the storage container generates the vapor molecules.

6. The method of claim 3, wherein the vapor molecules are introduced into the cylinder through an intake valve.

7. The method of claim 3, wherein the vapor molecules are injected directly into the cylinder.

8. The method of claim 3, wherein the vapor molecules are metered into an intake manifold by a mass flow controller.

9. The method of claim 2 further comprising mixing the vapor molecules with a fuel.

10. The method of claim 9, wherein the vapor molecules and the fuel are mixed before introducing into the cylinder.

11. The method of claim 9, wherein the vapor molecules and the fuel are mixed in the cylinder.

12. An alternative fuel vehicle, comprising:
   a. an engine, the engine comprising
      i. a cylinder, and
      ii. a piston housed inside the cylinder; and
   b. an alternative fuel comprising water vapor molecules with unnatural bond angles greater than approximately 104.5 degrees to provide energy to the engine, wherein the alternative fuel is introduced into the cylinder of the engine for actuation to generate energy to drive the piston inside the cylinder to create work;
   c. a means for introducing the alternative fuel into the cylinder, the means selected from the group consisting of a passive flow device, a metering device, and an injection device;
   d. an alternative fuel generator carried on the vehicle to generate the alternative fuel and contain the alternative fuel in a compressed state; and
   e. a line connecting the alternative fuel generator to the engine to feed the alternative fuel to the engine.

13. An alternative fuel vehicle, comprising:
   a. an engine, the engine comprising:
      i. a cylinder, and
      ii. a piston housed inside the cylinder; and
   b. an alternative fuel comprising water vapor molecules with unnatural bond angles greater than approximately 104.5 degrees, wherein the alternative fuel is introduced into the cylinder of the engine and actuated to release energy to drive the piston inside the cylinder.

14. The alternative fuel vehicle of claim 13, wherein the engine comprises a means for introducing the alternative fuel into the cylinder.

15. The alternative fuel vehicle of claim 14 further comprising:
   a. a first fuel injector to inject a fuel into the cylinder; and
   b. a second fuel injector to inject the alternative fuel into the cylinder.

16. The alternative fuel vehicle of claim 14 further comprising a carburetor, the carburetor comprising:
   a. a throttle body having a first end and a second end;
   b. a channel within the throttle body extending from the first end to the second end, the channel having a wall;
   c. a throttle plate positioned at the second end, the throttle plate rotatable within the channel;
   d. a fuel inlet within the wall of the channel to introduce the fuel into the carburetor; and
   e. an alternative fuel inlet within the wall of the channel to introduce the alternative fuel into the carburetor to mix with the fuel.

17. The alternative fuel vehicle of claim 13 further comprising a mass flow controller to meter an amount of the alternative fuel into the cylinder.

18. The alternative fuel vehicle of claim 13 further comprising:
   a. a storage container; and
   b. a line connecting the storage container to the engine to feed the alternative fuel to the engine.

19. The alternative fuel vehicle of claim 18, wherein the storage container is a pressurized vessel.

20. The alternative fuel vehicle of claim 18, wherein the storage container generates the water vapor molecules with unnatural bond angles.

21. A method of powering an engine, comprising:
   a. introducing water vapor molecules with unnatural bond angles greater than approximately 104.5 degrees ("vapor molecules") into an engine; and
   b. actuating the vapor molecules to create kinetic energy.

22. The method of claim 21, wherein the engine is an internal combustion engine.

* * * * *